(12) United States Patent
Hoemann et al.

(10) Patent No.: US 10,644,551 B2
(45) Date of Patent: May 5, 2020

(54) SPOKED ROTOR FOR AN ELECTRIC MOTOR

(71) Applicant: NIDEC MOTOR CORPORATION, St. Louis, MO (US)

(72) Inventors: Keith I. Hoemann, Fenton, MO (US); Michael W. Major, Moro, IL (US); Philip S. Johnson, Granite City, IL (US); William R. Lewis, Hazelwood, MO (US); Kent A. Sheeran, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 415 days.

(21) Appl. No.: 15/622,190

(22) Filed: Jun. 14, 2017

(65) Prior Publication Data

US 2017/0288486 A1    Oct. 5, 2017

Related U.S. Application Data

(63) Continuation-in-part of application No. 14/706,771, filed on May 7, 2015, now abandoned.

(60) Provisional application No. 62/020,697, filed on Jul. 3, 2014.

(51) Int. Cl.
| | |
|---|---|
| *H02K 15/12* | (2006.01) |
| *H02K 1/27* | (2006.01) |
| *H02K 1/30* | (2006.01) |

(52) U.S. Cl.
CPC ............ *H02K 1/2773* (2013.01); *H02K 1/30* (2013.01); *H02K 15/12* (2013.01)

(58) Field of Classification Search
CPC .................................................. H02K 1/2773
USPC ..................................................... 310/45, 214
See application file for complete search history.

(56) References Cited

U.S. PATENT DOCUMENTS

| | | | | |
|---|---|---|---|---|
| 3,140,413 | A  * | 7/1964 | Terry | H02K 19/20 |
| | | | | 310/168 |
| 2002/0047488 | A1* | 4/2002 | Webb | H02K 5/08 |
| | | | | 310/273 |
| 2014/0103771 | A1* | 4/2014 | Figgins | H02K 1/28 |
| | | | | 310/156.15 |

* cited by examiner

*Primary Examiner* — Jianchun Qin
(74) *Attorney, Agent, or Firm* — Hovey Williams LLP

(57) ABSTRACT

A rotor is provided for use in an electric motor. The rotor includes a shaft assembly rotatable about an axis. The rotor also includes a plurality of magnets arranged arcuately about the shaft assembly, and a plurality of pole segments arranged arcuately about the shaft assembly. The pole segments alternate with the magnets, such that each of the magnets is at least in part interposed between adjacent pole segments. The pole segments interlock with the coupling element.

19 Claims, 26 Drawing Sheets

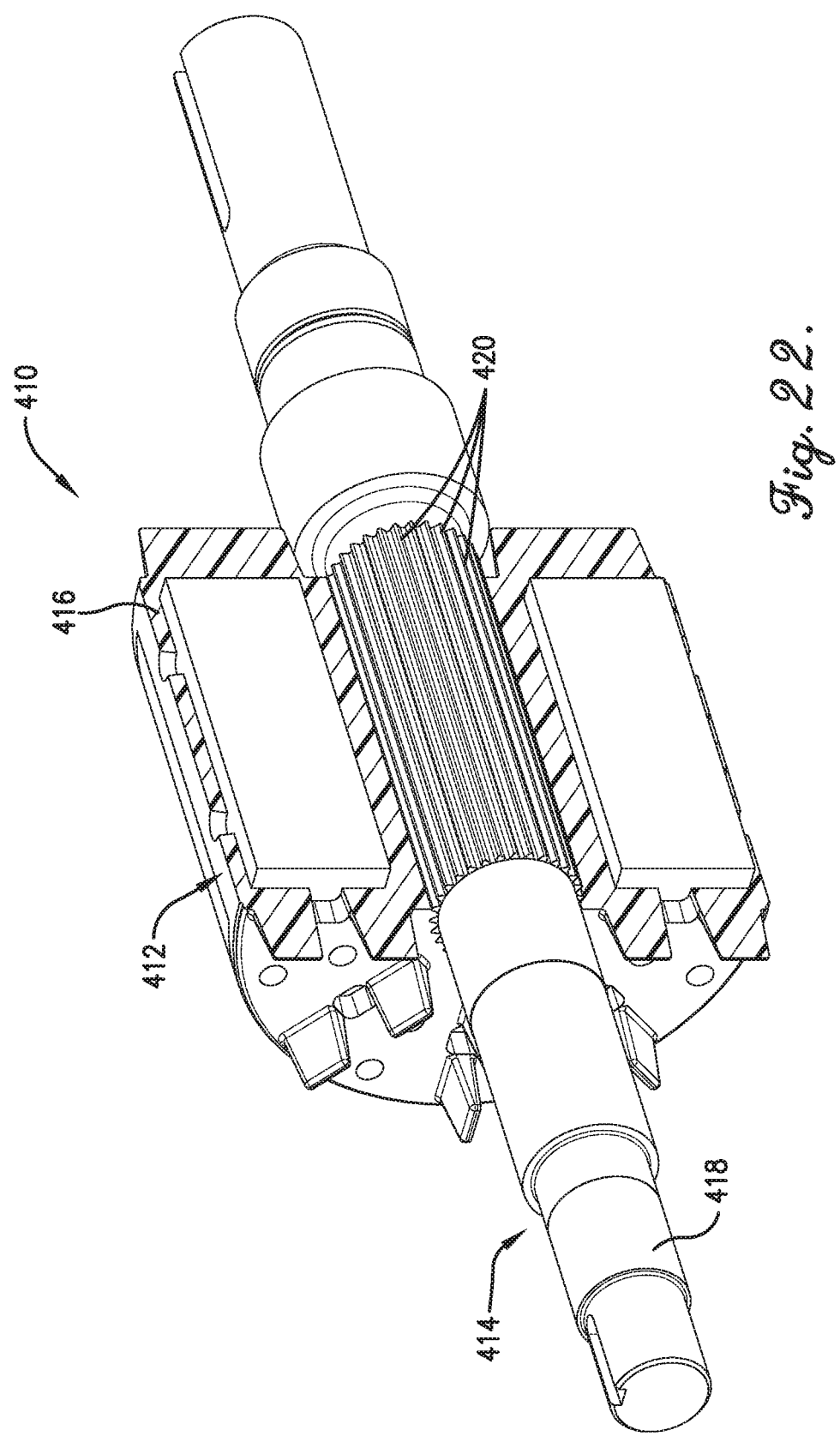

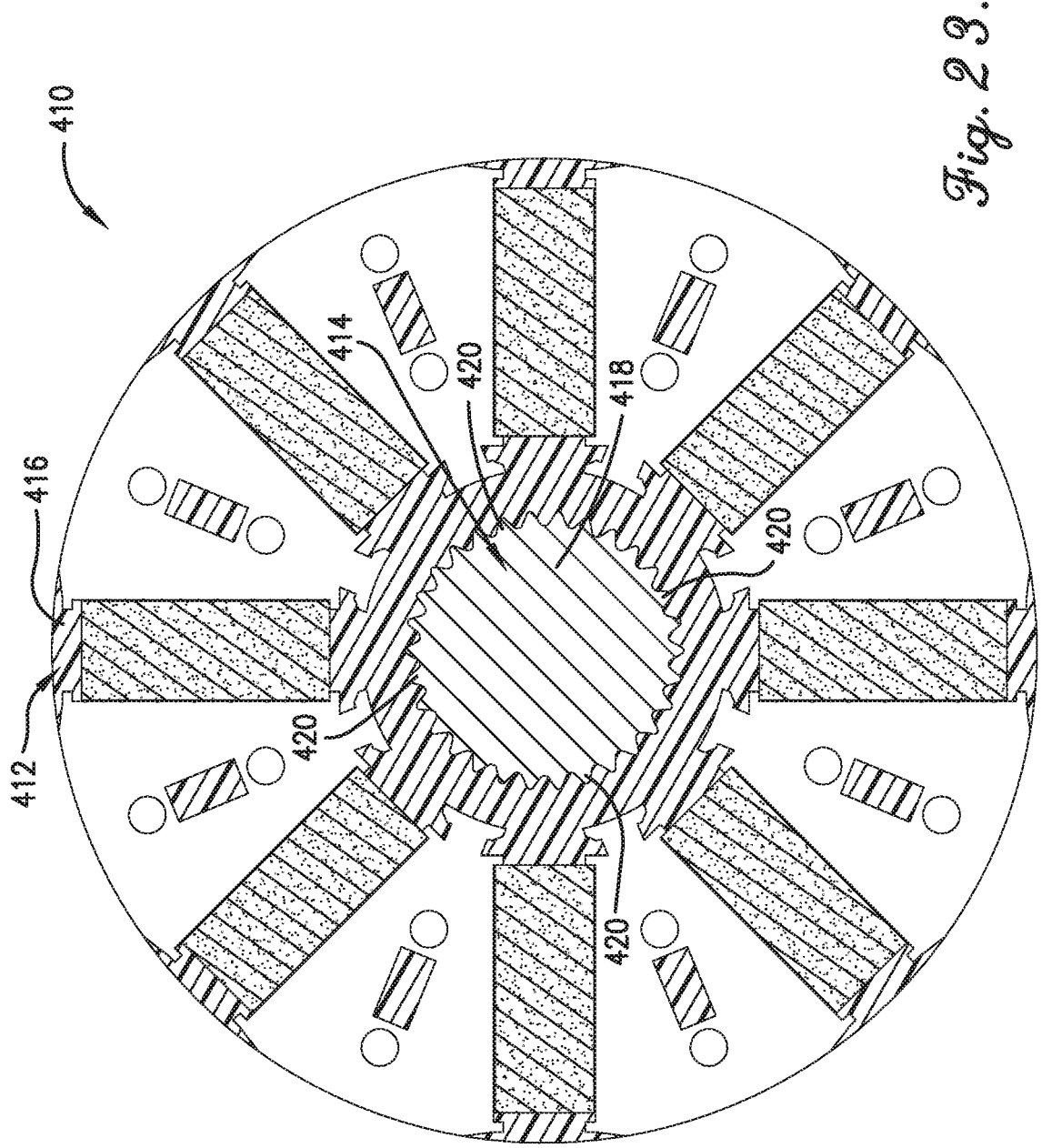

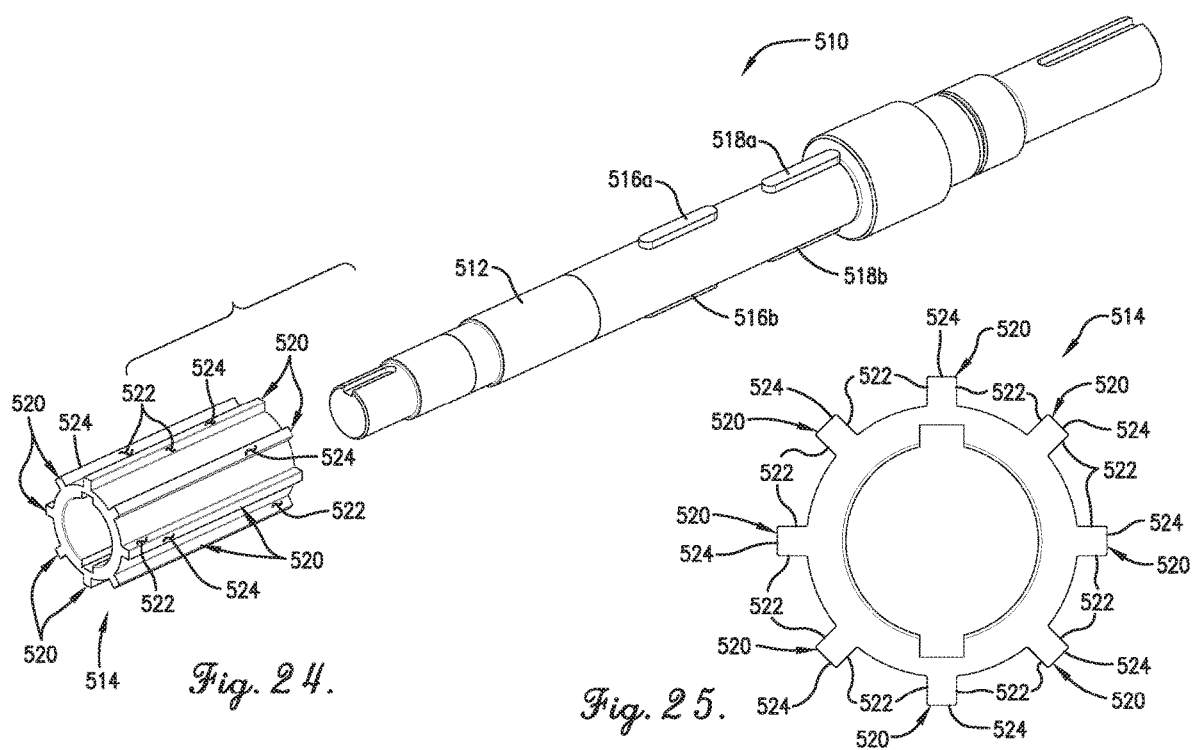

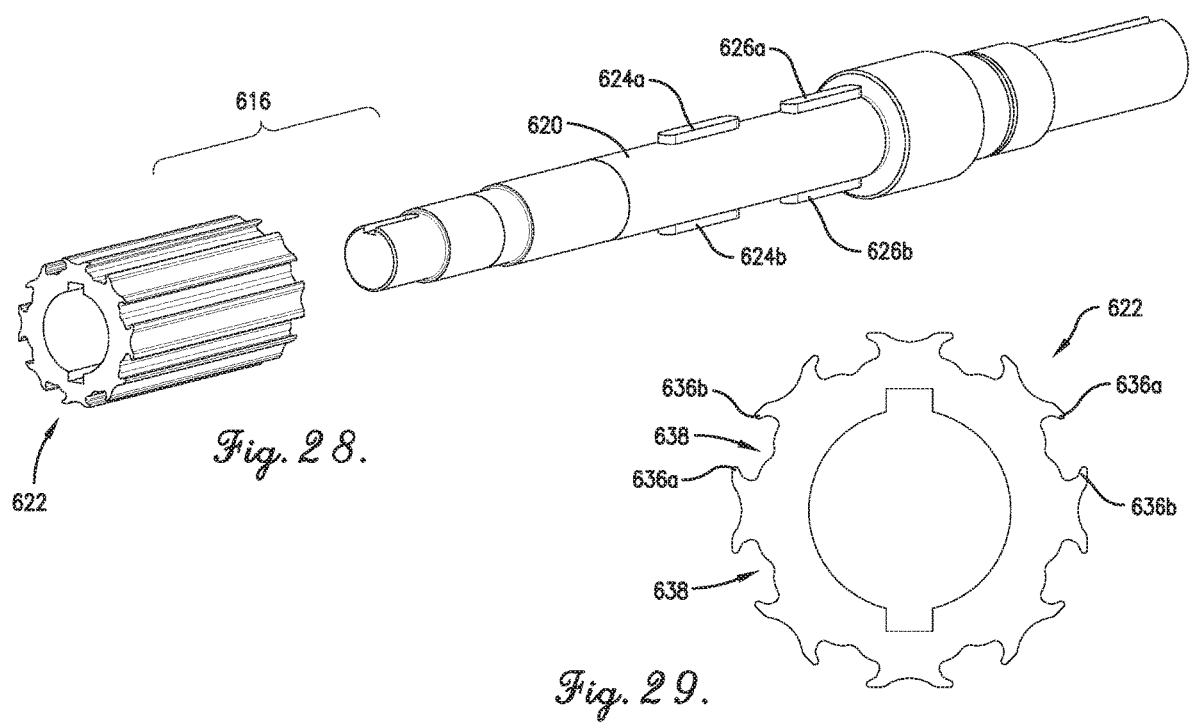

the present invention;

SPOKED ROTOR FOR AN ELECTRIC MOTOR

CROSS-REFERENCE TO RELATED APPLICATION

This application is a continuation-in-part and claims priority benefit with regard to all common subject matter of U.S. patent application Ser. No. 14/706,771, entitled "SPOKED ROTOR FOR AN ELECTRIC MOTOR," filed on May 7, 2015, which claims priority benefit from U.S. Provisional Application No. 62/020,697, filed Jul. 3, 2014. The disclosures of the aforementioned applications are incorporated by reference in their entirety herein.

BACKGROUND OF THE INVENTION

1. Field of the Invention

The present invention relates generally to an electric motor. The motor preferably improves system efficiency in applications including but not limited to heating, ventilation, and air conditioning (HVAC) systems; pumps; and home appliances. More particularly, the motor preferably concentrates magnetic flux and reduces flux leakage, resulting in higher power density. Yet further, the motor ideally has low manufacturing complexity, high structural rigidity, and reduced active material and cost. The motor also preferably minimizes or at least substantially eliminates electrical arcing within the bearings.

2. Discussion of the Prior Art

Electric motors are conventionally used in applications including but not limited to heating, ventilation, and air conditioning (HVAC) systems; pumps; and home appliances. Such motors conventionally include a stator and a rotor. The rotor conventionally includes a generally toroidal rotor core and a plurality of surface magnets mounted about a perimeter of the core.

Furthermore, electric motors are conventionally subject to damaging electrical arcing within the bearings.

SUMMARY

According to one aspect of the present invention, a rotor is provided for use in an electric motor. The rotor includes a shaft assembly rotatable about an axis. The shaft assembly includes a shaft, a coupling element, and a key interconnecting the shaft and the coupling element. The rotor also includes a plurality of magnets arranged arcuately about the shaft assembly, and a plurality of pole segments arranged arcuately about the shaft assembly. The pole segments alternate with the magnets, such that each of the magnets is at least in part interposed between adjacent pole segments. The pole segments interlock with the coupling element. The coupling element comprises a monolithic, homogenous body that extends circumferentially about the shaft, with the body projecting from the shaft to interlock with the pole segments.

According to another aspect of the present invention, a rotor is provided for use in an electric motor. The rotor includes a shaft assembly rotatable about an axis. The shaft assembly includes a shaft and a metal coupling element. The rotor also includes a plurality of magnets arranged arcuately about the shaft assembly, and a plurality of pole segments arranged arcuately about the shaft assembly. The pole segments alternate with the magnets, such that each of the magnets is at least in part interposed between adjacent pole segments. The pole segments interlock with the coupling element.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 22 is a partially sectioned front perspective view of a rotor in accordance with a third preferred embodiment of the present invention;

FIG. 23 is a cross-sectional front view of the rotor of FIG. 22;

FIG. 24 is an axially exploded front perspective view of a shaft and coupler of a rotor in accordance with a fourth preferred embodiment of the present invention;

FIG. 25 is a front view of the coupler of FIG. 24;

FIG. 28 is an axially exploded front perspective view of the shaft, interconnecting keys and coupling element of the rotor of FIG. 26; and FIG. 29 is a cross-sectional front view of the coupling element of the rotor of FIG. 26.

Figure 1:
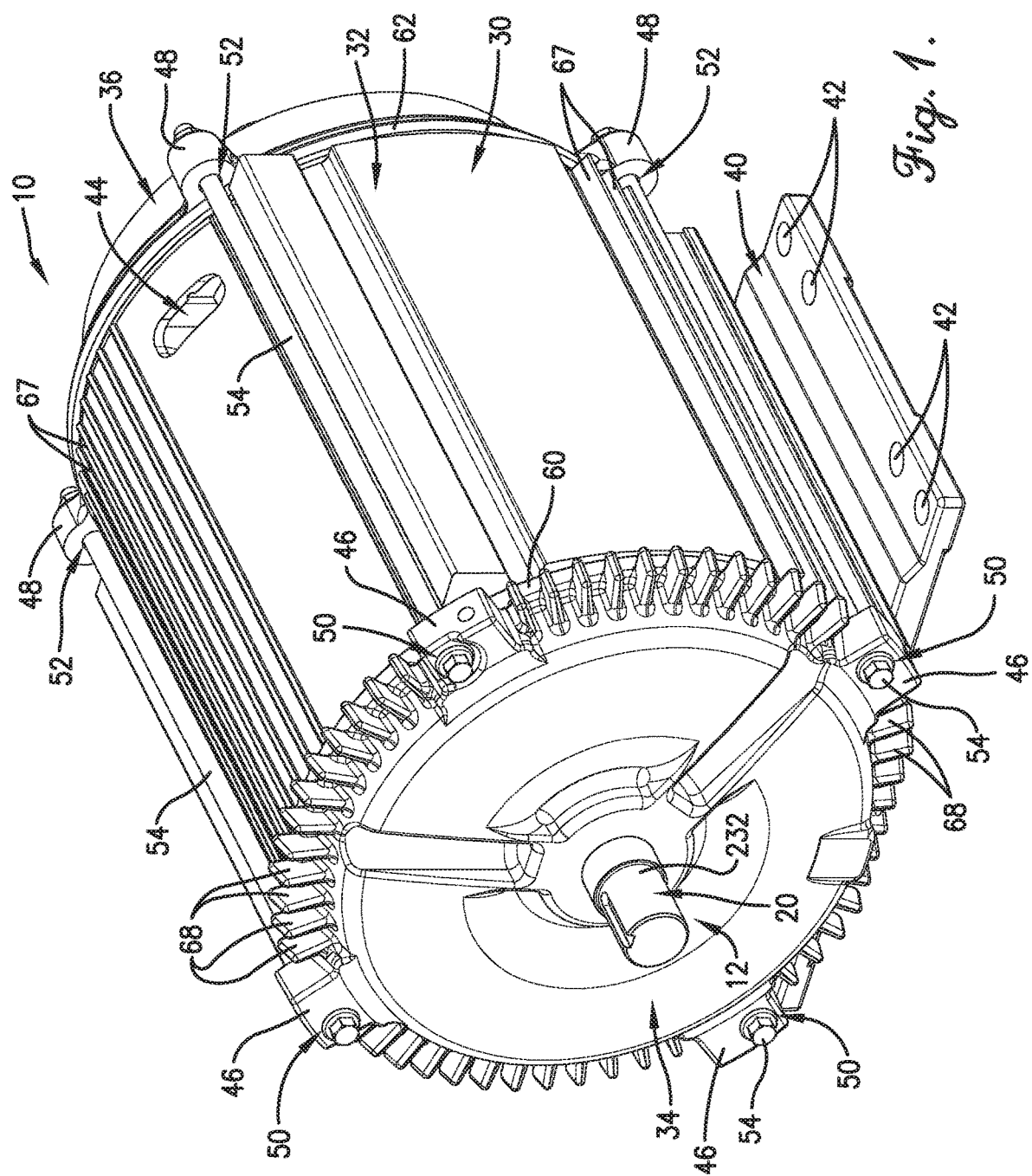
FIG. 1 is a front perspective view of a motor constructed in accordance with a first preferred embodiment of the present invention.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 2:
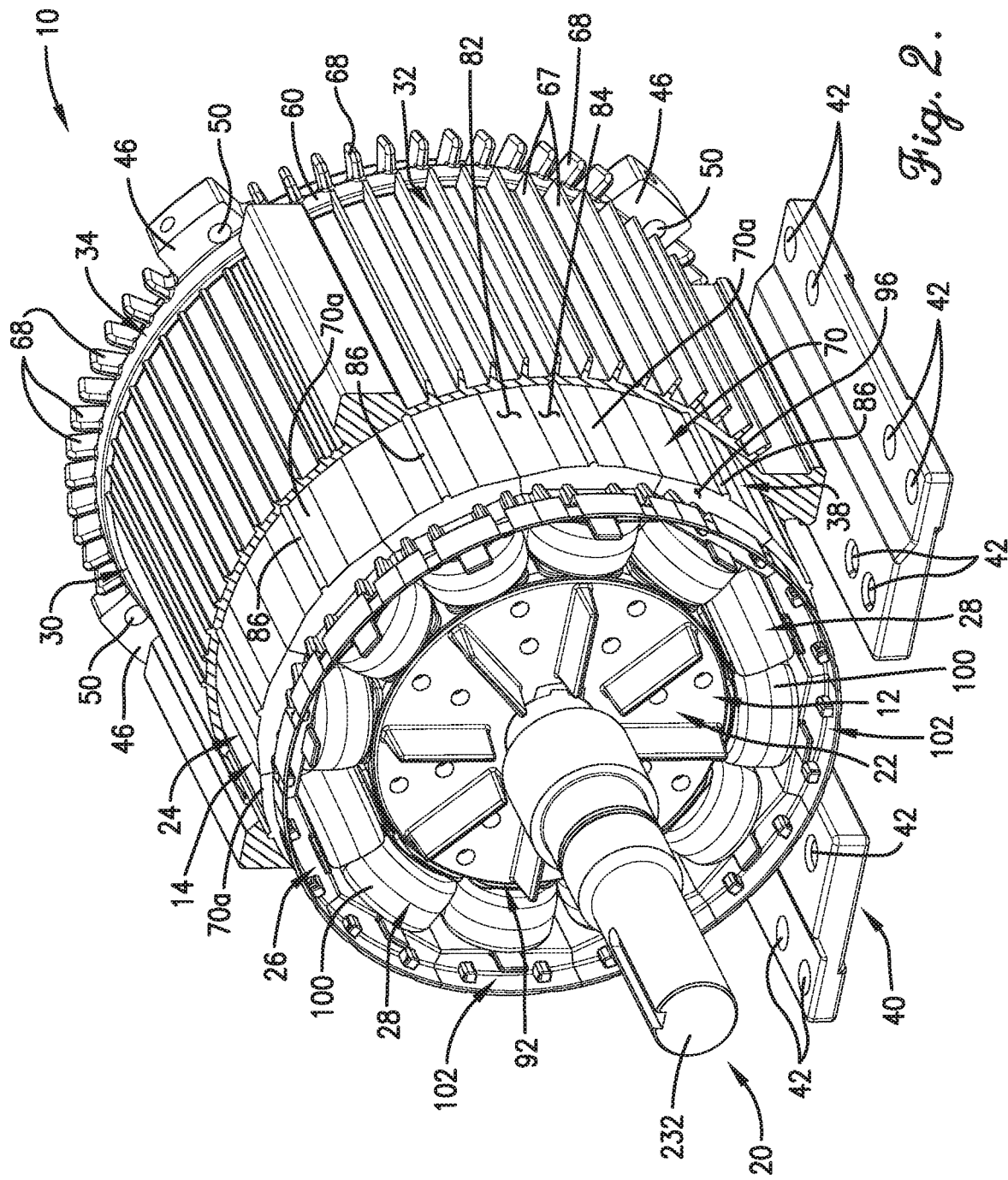
FIG. 2 is a partially sectioned rear perspective view of the motor of FIG. 1.

With initial reference to FIGS. 1 and 2, an electric motor 10 is provided for use in a machine. In a preferred embodiment, the motor 10 is configured for use in a heating, ventilation, and air conditioning (HVAC) system; a pump; or a home appliance. However, alternative applications fall within the scope of the present invention.

In a preferred embodiment, the motor 10 has a horsepower range between about (1) hp and about twenty (20) hp. More preferably, the horsepower range is between about two (2) hp and about fifteen (15) hp. Most preferably, the horsepower range is between about three (3) hp and about ten (10) hp. However, higher or lower horsepower motors fall within the scope of some aspects of the present invention.

Preferably, the motor 10 is a variable speed motor, with an operating range from about zero (0) rpm to about four thousand (4,000) rpm. However, it is within the ambit of the present invention for the motor to be a single-speed motor or to have a different speed range.

The motor 10 broadly includes a rotor 12 and a stator 14. The rotor 12 is rotatable about an axis. In a preferred embodiment, as shown, the stator 14 at least substantially circumscribes the rotor 12, such that the motor 10 is an inner rotor motor. It is permissible according to some aspects of the present invention, however, for the motor to be an outer rotor motor.

As will be discussed in greater detail below, the rotor 12 preferably includes a rotor core 16, a plurality of magnets 18, a shaft assembly 20 defining a rotational axis for the rotor 12, and a retention structure 22.

As will also be discussed in greater detail below, the stator 14 preferably includes a stator core 24, an electrically insulative covering 26 on the stator core 24, and a plurality of coils 28 wound about the stator core 24.

As best shown in FIGS. 1 and 2, the motor 10 further preferably includes a housing 30. The housing 30 preferably includes a shell 32, a front endshield 34, and a rear endshield 36, The shell 32 and the front and rear endshields 34 and 36, respectively, preferably present a motor chamber 38 that at least substantially receives the stator 14 and the rotor 12.

The motor 10 further preferably includes a mounting bracket 40 for mounting the motor 10 on a machine (not shown). More particularly, the bracket 40 preferably includes a plurality of fastener-receiving holes 42 for receiving fasteners (not shown) for securing the bracket 40 and the remaining portion of the motor 10 on the machine.

In a preferred embodiment, the bracket 40 is integrally formed with the shell 32. However, non-integral formation is permissible. Furthermore, any of a variety of suitable mounting means may be provided without departing from the scope of the present invention.

In a preferred embodiment, the shell 32 extends generally circumferentially about the stator 14. It is permissible according to some aspects of the present invention, however, for the shell to extend in such a manner as to provide one or more flat sides, in contrast to the preferred generally cylindrical form, or to be otherwise alternatively shaped.

The shell 32 preferably extends continuously except for an access portal 44, such that the motor 10 is a closed motor. However, it is permissible according to some aspects of the present invention for the shell to be devoid of the access portal and/or include a plurality of ventilation openings. Such vent openings could, for instance, be evenly arcuately spaced apart about one or both axial ends of the shell.

The front and rear endshields 34 and 36 preferably support respective front and back bearings (not shown) that rotatably support the shaft assembly 20. Alternative or additional bearings supports or shaft assembly supports may be provided without departing from the scope of the present invention, however.

The front and rear endshields 34 and 36 are preferably secured to the shell 32. More particularly, as shown in FIG. 1, the endshields 34 and 36 each preferably define corresponding pluralities of evenly arcuately spaced apart bosses 46 and 48, respectively. Each boss 46 or 48 preferably defines a respective fastener-receiving hole 50 or 52. A fastener 54 preferably extends through corresponding pairs of holes 50 and 52 to restrict axial shifting of the endshields 34 and 36 relative to the shell 32.

Figure 4:
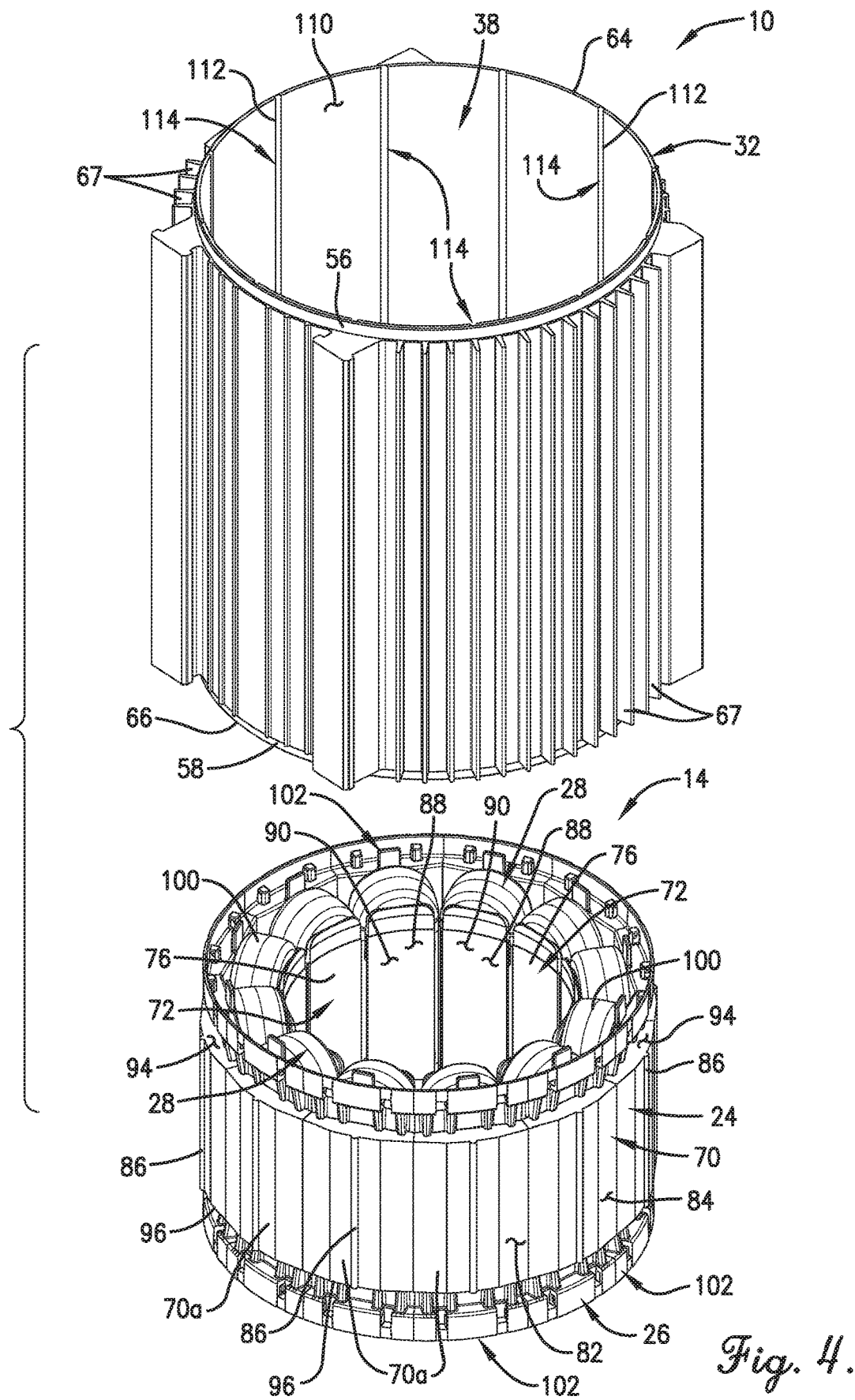
FIG. 4 is a partially exploded perspective view of the stator and motor shell of FIGS. 1 and 2.
Figure 5:
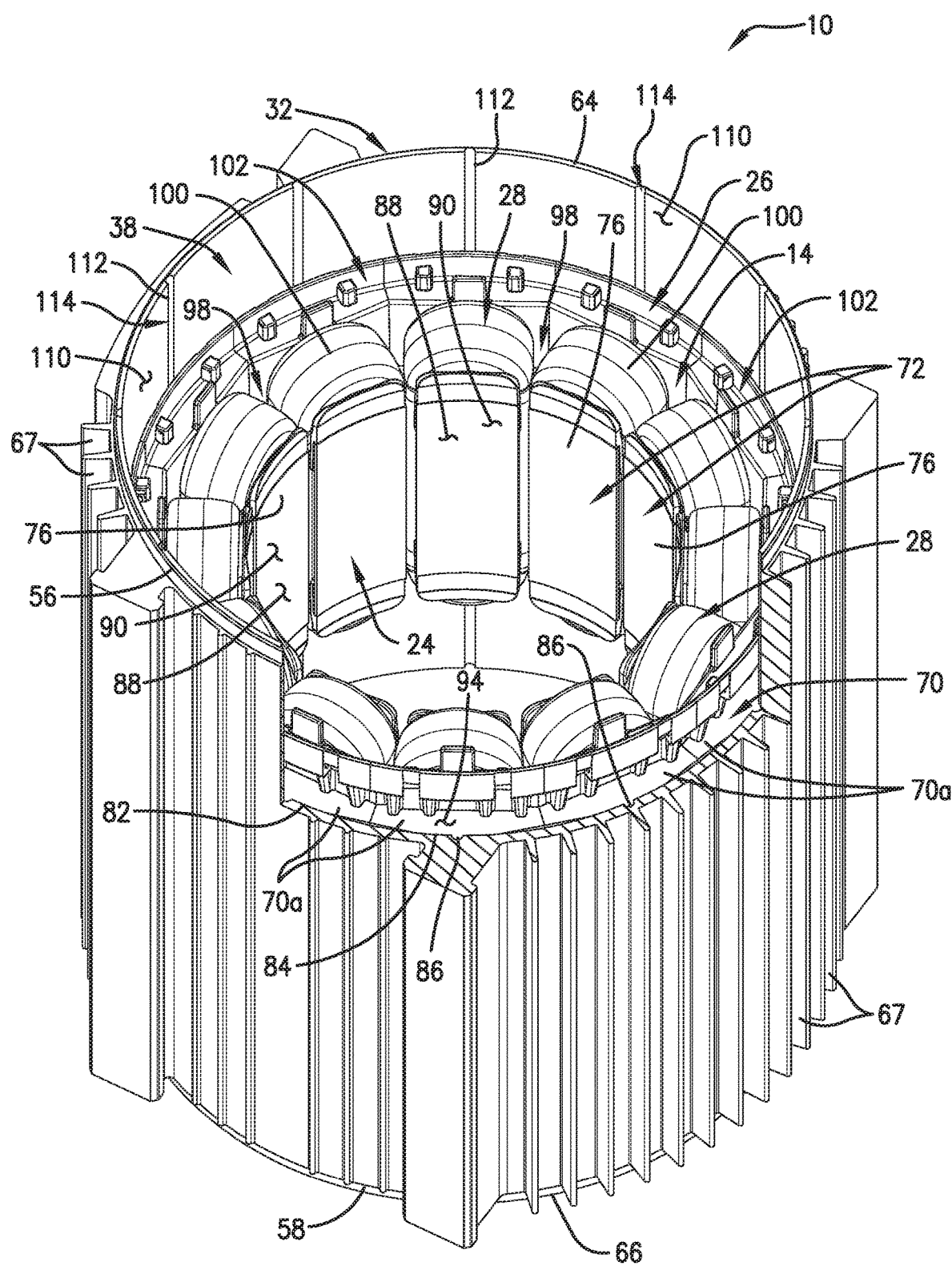
FIG. 5 is a partially sectioned perspective view of the stator and motor shell of FIGS. 1, 2, and 4.
Figure 6:
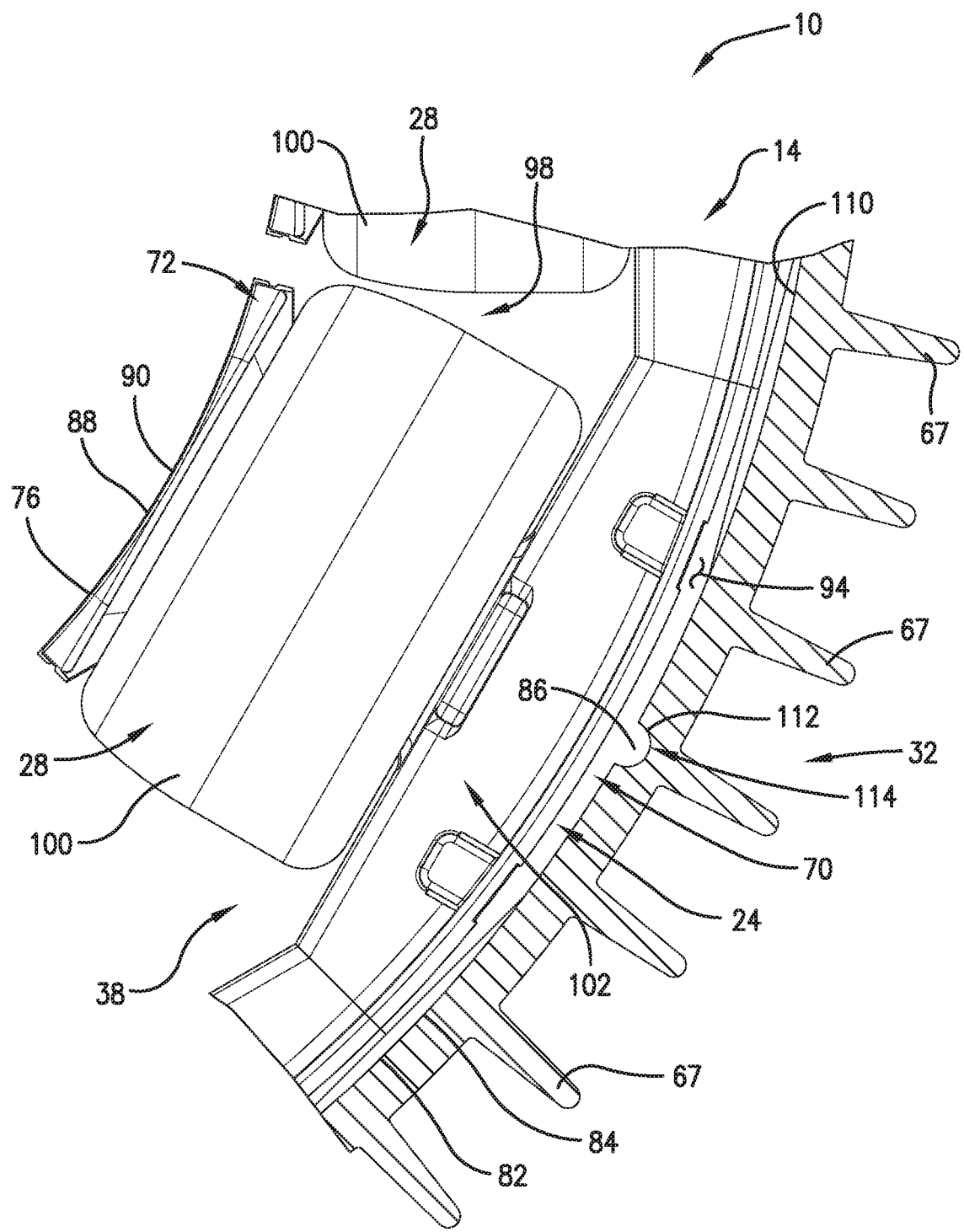
FIG. 6 is an enlarged, partially sectioned front view of the stator and motor shell of FIGS. 1, 2, 4, and 5, particularly illustrating an interconnecting rib and groove of the stator and motor shell, respectively.
Figure 7:
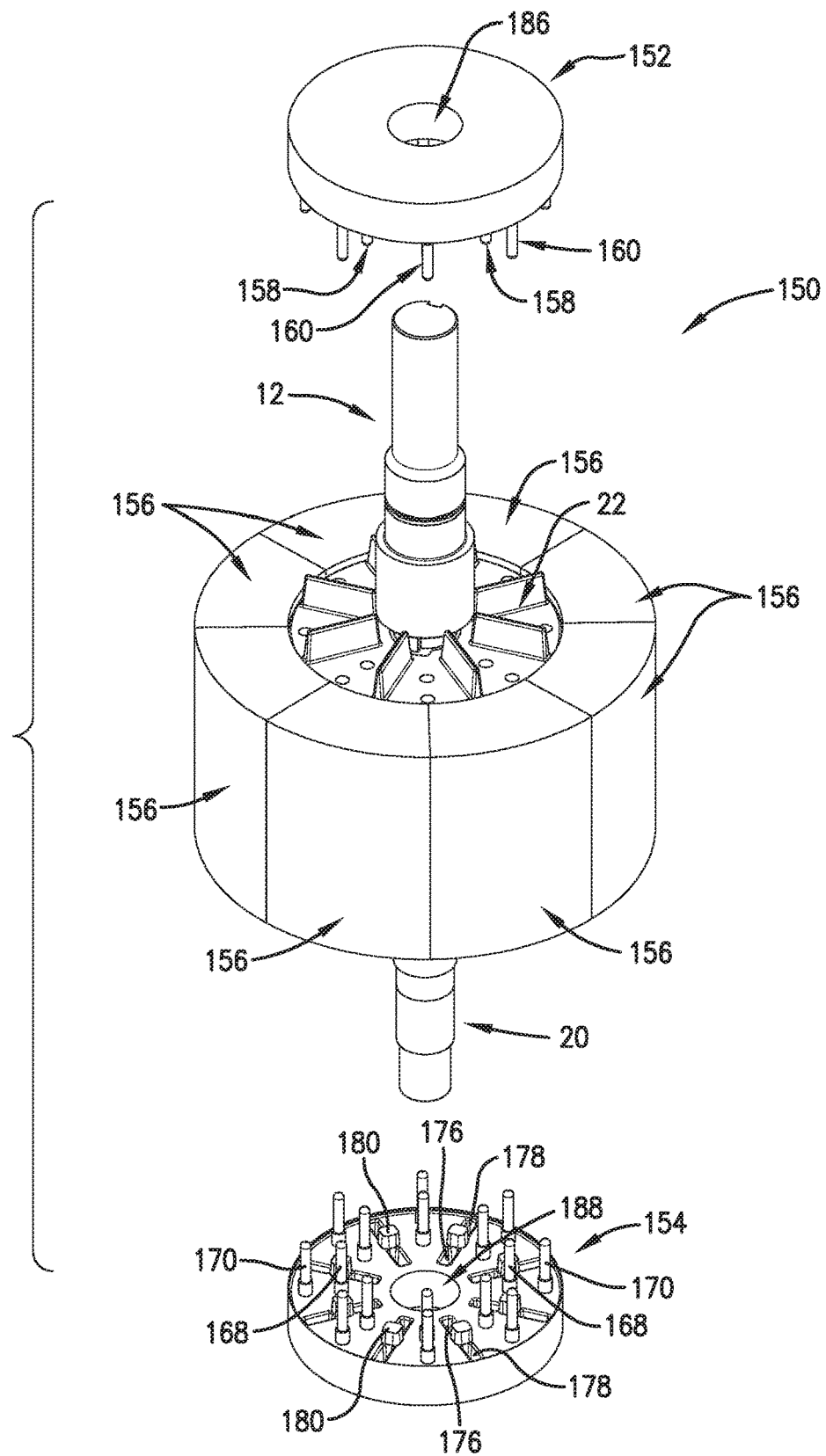
FIG. 7 is an axially exploded perspective view the rotor of FIGS. 1 and 2, as well as the mold for application of the rotor overmolding.

Furthermore, as shown in FIGS. 4 and 5, the shell 32 preferably includes a pair of circumferentially extending, constricted flanges 56 and 58. Each endshield 34 and 36 preferably includes a respective circumferentially extending lip 60 or 62 (see FIG. 1) that overlies the corresponding one of the flanges 56 and 58. It is permissible according to some aspects of the present invention, however, for one or both of the lips to instead be formed on the shell or for one or more of the flanges to instead be formed on the endshield or endshields. It is also permissible for the lips and flanges to be omitted entirely or replaced with an alternative interconnection means (e.g., latches or adhesives) without departing from the scope of the present invention.

In a preferred embodiment, the flanges 56 and 58 present first and second axially endmost front and rear shell margins 64 and 66, respectively.

In a preferred embodiment, the shell 32 includes a plurality of evenly arcuately spaced apart shell fins 67. The shell fins 67 are preferably axially extending and radially protruding. In a preferred embodiment, the shell fins 67 are distributed along about half of the circumference of the shell 32. However, it is permissible for a greater or lesser portion (including none) of the shell to be finned, for the shell fins to be unevenly spaced, and/or for the shell fins to be alternatively oriented (e.g., extending generally circumferentially rather than axially).

The shell fins 67 are preferably operable to disperse heat associated with operation of the motor 10.

In a preferred embodiment, the front endshield 34 is provided with a plurality of evenly arcuately spaced apart endshield fins 68 (except where the bosses 46 are located). The endshield fins 68 preferably extend axially and protrude radially outwardly. In a preferred embodiment, the endshield fins 68 are distributed around the entire circumference of the front endshield 34. However, it is permissible for a greater or lesser portion (including none) of the endshield to be finned, for the endshield fins to be unevenly spaced, and/or for the endshield fins to be alternatively oriented (e.g., extending generally circumferentially rather than axially).

The endshield fins 68 are preferably operable to disperse heat associated with operation of the motor 10.

The rear endshield 48 is preferably devoid of fins. It is permissible, however, to provide the rear endshield with fins without departing from the spirit of the present invention.

In a preferred embodiment, as illustrated, the endshields 34 and 36 are at least substantially solid in construction, such that ingress of contaminants therethrough is at least generally prohibited. It is permissible according to some aspects of the present invention, however, for either or both of the endshields to define openings therethrough.

As noted previously, the stator 14 preferably includes a stator core 24, an electrically insulative covering 26 on the stator core 24, and a plurality of coils 28 wound about the stator core 24.

In a preferred embodiment, the stator 14 is generally toroidal in form. The stator core 24 is likewise preferably generally toroidal in form and defines an axis of the stator 14. Preferably, the axis of the stator 14 is coaxial with that of the rotor 12. However, it is permissible according to some aspects of the present invention for the axes to be non-coaxial.

The stator core 24 preferably includes an annular yoke 70 and a plurality of arcuately spaced apart teeth 72 extending at least generally radially from the yoke 70.

Preferably, the teeth 72 extend radially inwardly from the yoke 70 (because of the preferred inner rotor motor design), although it is permissible according to some aspects of the present invention for the teeth to extend generally outwardly (in the case of an outer rotor motor).

In a preferred embodiment, as illustrated, the yoke 70 comprises a plurality of discrete yoke portions 70a, each of which is associated with one of the teeth 72. More particularly, one tooth 72 preferably extends from each yoke portion 70a. The yoke portions 70a are preferably interconnected by any suitable means, including but not limited to tongue and groove interconnections, welding, adhesives, friction, and/or circumferential forces. It is permissible, however, for the yoke to instead be devoid of discrete portions or to have discrete portions associated with more or fewer teeth. For instance, the yoke could instead include three (3) portions, with a plurality of teeth extending from each portion.

Each tooth 72 preferably includes a generally radially extending arm 74 and a generally arcuately extending crown 76 extending from one end of the arm 74.

Each arm 74 preferably presents a pair of arcuately spaced apart tooth side faces 78.

The yoke 70 preferably presents an inner circumferential yoke face 80 and an outer circumferential yoke face 82.

In the preferred inner rotor motor embodiment, the inner circumferential yoke face 80 is preferably discontinuous due to the teeth 72 extending radially inwardly therefrom. The outer circumferential yoke face 82 is preferably at least substantially continuous (albeit perhaps with incidental discontinuities between adjacent yoke segments 70a) and preferably defines an outer radial surface 84 of the stator core 24.

However, as noted previously, it is permissible according to some aspects of the present invention for the motor to alternatively be an outer rotor motor. In such an alternative embodiment, the inner circumferential yoke face might extend continuously to present an inner radial margin of the stator core, while the outer circumferential yoke face might be discontinuous due to the teeth extending radially outwardly therefrom.

As will be discussed in greater detail below, the yoke 70 preferably presents a plurality of arcuately evenly spaced apart, generally axially extending ribs 86 extending from the outer circumferential yoke face 82 (i.e., protruding radially outwardly from the outer radial surface 84 of the stator core 24). It is permissible according to some aspects of the present invention, however, for the ribs to alternatively be unevenly spaced apart.

As will be discussed in greater detail below, the ribs 86 preferably serve as part of the connection between the stator core 24 and the shell 32.

Preferably, each yoke segment 70a presents one of the ribs 86, with the ribs 86 being positioned in radial alignment with corresponding ones of the arms 74 of the teeth 72. That is, each rib 86 preferably corresponds to one of the teeth 72. It is permissible, however, for the number and positioning of the ribs to be entirely disassociated from the yoke portions and/or the teeth. For instance, the ribs might be distributed about only a portion of the circumference of the stator core.

Each crown 76 preferably presents a circumferential crown face 88 spaced opposite the yoke 70. The circumferential crown faces 88 preferably cooperatively define an inner radial surface 90 of the stator core 24.

In an alternative outer rotor motor embodiment, however, the crown faces might instead present an outer radial margin of the stator core.

The stator core 24 preferably has an outer diameter defined by the outer radial surface 84. The outer diameter of the stator core 24 is preferably between about one hundred seventy (170) mm and about two hundred ten (210) mm. More preferably, the outer diameter of the stator core 24 is between about one hundred eighty (180) mm and about two hundred (200) mm. Most preferably, the outer diameter of the stator core 24 is about one hundred ninety (190) mm.

It is permissible according to some aspects of the present invention for the outer diameter of the stator core to vary from the preferred dimensions described above. As will be discussed in greater detail below, however, the outer diameter of the stator core 24 preferably correlates to the inner diameter of the shell 32.

In a preferred embodiment, the outer radial surface 84 of the stator core 24 also defines the outer diameter of the stator 14 as a whole.

The stator core 24 preferably has an inner diameter defined by the inner radial surface 90. The inner diameter of the stator core 24 is preferably between about one hundred (100) mm and about one hundred forty (140) mm. More preferably, the inner diameter of the stator core 24 is between about one hundred ten (110) mm and about one hundred thirty (130) mm. Most preferably, the inner diameter of the stator core 24 is about one hundred twenty (120) mm.

It is permissible according to some aspects of the present invention, however, for the inner diameter of the stator core to vary from the preferred dimensions described above. However, in a preferred inner rotor motor 10, as illustrated, such diameter must necessarily be larger than the outer diameter of the rotor 12. More particularly, as will be discussed in greater detail below, the rotor 12 and the stator 14 preferably define a thin, circumferentially extending gap 92 therebetween.

The gap 92 is preferably less than about five (5) mm in radial thickness and, more preferably, less than about three (3) mm in radial thickness. Most preferably, the gap 92 is less than about two (2) mm in radial thickness. However, the gap thickness may vary without departing from the scope of the present invention.

Preferably, the yoke 70 and the teeth 72 cooperatively present opposite axial stator core end faces 94 and 96. The end faces 94 and 96 are preferably at least substantially planar and parallel with each other, although non-parallel and/or non-planar surfaces are permissible according to some aspects of the present invention.

As will be discussed in greater detail below, the ribs 86 preferably extend continuously between and interconnect the end faces 94 and 96. It is permissible according to some aspects of the present invention, however, for one or more of the ribs to extend only part of the distance between the end faces and/or to extend discontinuously (e.g., in a dashed pattern) therebetween.

Each pair of adjacent teeth 72 preferably defines a slot 98 therebetween. Preferably, the stator core 24 includes twelve (12) teeth 72, such that twelve (12) slots 98 are defined. However, it is permissible according to some aspects of the present invention for the number of teeth and, in turn, the number of slots, to vary.

The coils 28 preferably comprise electrically conductive wiring 100. The wiring 100 is preferably wound about each of the teeth 72 through the slots 98 to form the coils 28, with each of the coils 28 corresponding to one of the teeth 72. More particularly, the wiring 100 is preferably wound about each arm 74 to form the coils 28.

The wiring 100 preferably comprises copper, although aluminum or any one or more of a variety of electrically conductive materials may be used without departing from the scope of the present invention.

The wiring 100 is preferably wound in such a manner that the motor 10 is a three (3) phase motor. Alternative phasing is permissible within the scope of the present invention, however.

The stator core 24 is preferably a laminated stator core comprising a plurality of axially stacked laminations (not shown). However, it is permissible for the stator core to be a solid stator core without departing from the scope of the present invention.

The stator core 24 preferably comprises steel. However, it is permissible without departing from the scope of some aspects of the present invention for any one or more of a variety of suitable materials to be used for the stator core.

As noted previously, an insulative covering 26 is preferably provided on the stator core 24. The covering 26 preferably comprises an at least substantially electrically insulative material. In a preferred embodiment, for instance, the insulative covering 26 comprises a synthetic resin material. However, any one or more of a variety of substantially electrically insulative materials may be used without departing from the scope of the present invention.

Figure 3:
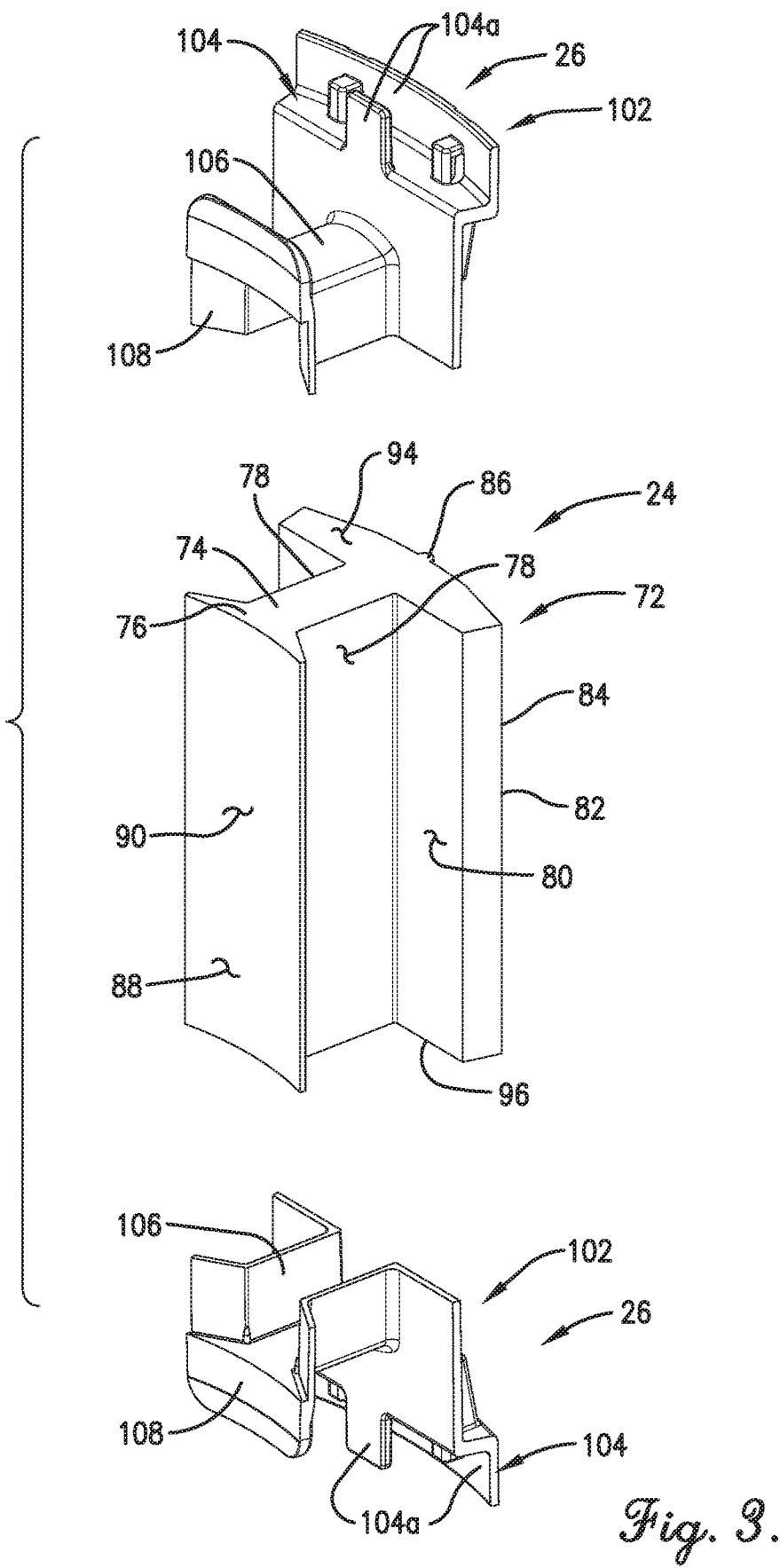
FIG. 3 is an exploded perspective view of a tooth and a pair of insulative caps of the stator of FIG. 2.

In a preferred embodiment and as best shown in FIG. 3, the insulative covering 26 comprises a plurality of electrically insulative endcaps 102. However, it is noted that use of any one or more of a variety of insulation means, including but not limited to the use of electrically insulative overmolding, powder-coating, inserts, and/or liners, is permissible according to some aspects of the present invention. It is also permissible according to some aspects of the present invention for the stator core to be devoid of electrical insulation.

In a preferred embodiment, a pair of endcaps 102 is fitted over opposite axial sides (corresponding to the first and second stator core end faces 94 and 96) of a corresponding yoke segment 70a and tooth 72 so as to in part encompass the yoke segment 70a and tooth 72.

More particularly, each endcap 102 preferably includes a yoke portion 104, an arm portion 106, and a crown portion 108. In a preferred embodiment, the portions 104, 106, and 108 correspond respectively to the corresponding yoke segment 70a and the arm 74 and crown 76 of the corresponding tooth 72.

Each yoke portion 104 preferably extends along at least a portion of a corresponding one of the first and second stator core end faces 94 and 96. The outer circumferential yoke face 82 is preferably left exposed.

The arm portions 106 preferably cooperatively discontinuously circumscribe the corresponding arms 74. More particularly, as shown in FIG. 3, each arm portion 106 extends along at least a portion of a corresponding one of the first and second stator core end faces 94 and 96. Each arm portion 106 further preferably extends axially along the side faces 78 of the arm 74 of a corresponding one of the teeth 72. Corresponding arm portions 106 preferably do not meet, however, with an axial gap instead being left therebetween such that a portion of the arm 74 (or, more particularly, of each side face 78) remains exposed.

Each crown portion 108 preferably extends along at least a portion of a corresponding one of the first and second stator core end margins 94 and 96. The crown faces 88 are preferably left exposed.

Preferably, each yoke portion 104 includes generally axially extending wire management structure 104a. The wire management structure 104a preferably restricts radially outward movement of the coils 28. Furthermore, at least part of each of the crown portions 108 preferably extends axially in such a manner as to restrict radially inward movement of the coils 28. Thus, the endcaps 102 preferably function both to insulate the stator core 24 and to assist in management of the wiring 100.

The wiring 100 is preferably wound about the teeth 72 on the outside of the arm portions 106 of the endcaps 102, such that the wiring 100 is not in direct contact with the stator core 24 itself where the endcaps 102 are present. That is, the covering 26 preferably electrically insulates the stator core 24 from the wiring 100 and additionally provides a physical barrier between the stator core 24 and the wiring 100.

Variations from the above-described general endcap structure are also permissible according to some aspects of the present invention. For instance, the endcaps could lack wire management structure, or corresponding pairs of the endcaps could extend axially so as to meet each other and thus fully encase the corresponding arm.

As will be discussed in greater detail below, the motor shell 32 preferably presents a radially inner shell surface 110. The shell 32 further preferably includes a plurality of evenly arcuately spaced apart groove-defining portions 112 distributed about the perimeter of the shell 32. Each groove-defining portion 112 preferably defines a generally axially extending groove 114 that recedes radially outwardly from the inner shell surface 110. It is permissible according to some aspects of the present invention, however, for the groove-defining portions to be unevenly spaced apart and/or to be distributed along only a portion of the shell. Yet further, it is permissible according to some aspects of the present invention for only a single groove-defining portion and corresponding groove to be present.

Preferably, the grooves 114 extend continuously between and interconnect the front and rear shell margins 64 and 66, respectively. It is permissible according to some aspects of the present invention, however, for one or more of the grooves to extend only part of the way between the margins and/or to extend discontinuously (e.g., a groove might be provided that includes halves extending inwardly from each margin but not meeting in the middle, particularly if the stator were split into two halves).

As will be discussed in greater detail below, the core 24 and the shell 32 are preferably interconnected via a thermal fitting process. More particularly, in a preferred embodiment, the motor shell 32 and the stator core 24 are interconnected via a thermally enabled interference fit (i.e., a shrink fit).

Broadly speaking, a "hot drop" process is preferably used, wherein the motor shell 32 is preferably heated, positioned about the stator core 24 (e.g., the stator core 24 is dropped into place inside the motor shell 32), and then actively or passively cooled. In its cooled state, the shell 32 has smaller dimensions than in its heated state, such that the tightness of the fit between the shell 32 and the stator core 24 increases as the shell 32 cools.

More particularly, in a preferred method of assembly, the entire shell 32 is initially heated to a topmost temperature at which the shell 32 and the stator core 24 are axially shiftable relative to each other without interference therebetween. While the shell retains sufficient heat, the shell 32 and the stator core 24 are rotationally oriented relative to each other so as to align each of the ribs 86 defined by the stator core 24 with a corresponding one of the grooves 114 defined by the shell 32. With the shell temperature still being sufficiently high, the stator core 24 and the shell 32 are axially shifted relative to each other (most preferably, the shell 32 is dropped over the stationary stator core 24) such that the stator core 24 is received in the shell 32. More particularly, each rib 86 is received in the corresponding groove 114 without interfering with the corresponding groove-defining portion 112; the stator core 24 is at least substantially received in the motor chamber 38; and the inner shell surface 110 at least substantially circumscribes the outer radial surface 84 of the stator core 24 without interference therewith. The shell 32 is then allowed to passively cool (e.g., by being left thermally undisturbed in the assembly location or a designated ambient cooling space) to an ambient temperature (e.g., a temperature of about seventy-five (75) ° F.).

Due at least in part to shrinkage of the grooves 114 as the motor shell 32 cools, each of the ribs 86 is preferably thereby fit in a corresponding one of the grooves 114 via an interference fit. Furthermore, the stator core 24 and the shell 32 in a broad sense are also preferably interconnected in an interference fit, with the shell 32 thereby applying radial compressive forces on the stator core 24 via engagement of the inner shell surface 110 and the outer radial surface 84 of the stator core 24.

The interference fit is preferably additionally be enabled by the radially outward shifting of the grooves 114 relative to the ribs 86 as the shell 32 expands in response to the elevation of its temperature. Such shifting may provide partial or complete radial clearance between the ribs 86 and the grooves 114. Upon cooling of the shell 32, the grooves 114 then shift radially inwardly so as to receiving the ribs 86 upon cooling of the shell 32. It is permissible, however, for the fit to be enabled by only one of the means described above (e.g., only groove expansion or only groove shifting).

Preferably, during the rotational orientation and axial shifting steps, the shell 32 is maintained at or above a minimum interference-free fit temperature that is less than or equal to the topmost temperature. The minimum interference-free fit temperature is the minimum shell temperature at which the ribs 86 are received in corresponding ones of the grooves 114 without interference.

It will be readily understood by one of ordinary skill in the art that the minimum interference-free fit temperature (and, in turn, the range of appropriate temperatures at which assembly of the stator core 24 and the shell 32 can occur) will vary according to factors including but not limited to (1) the materials chosen for the shell 32 and the stator core 24 (and, more particularly, the respective coefficients of thermal expansion of the materials); (2) the relative dimensions and geometries of the shell 32 and the stator core 24 (and, in particular, the dimensions and geometries of the ribs 86 relative to the grooves 114 and of the radially outer surface 84 of the stator core 24 relative to the inner shell surface 110); (3) the desired looseness of the fit during the initial states of assembly and tightness of the fit after assembly (i.e., after the stator shell 32 has cooled); (4) the environmental conditions in which assembly takes place; (5) the relative temperatures of the shell 32 and the stator core 24; and (6) the rapidity of the assembly process (with the minimum interference-free fit temperature potentially varying with time).

For instance, it is noted that, immediately upon shifting of the shell 32 and the core 24 relative to each other, but prior to contact therebetween, the core 24 will likely begin to itself increase in temperature due to convection of heat from the shell 32. Upon contact between the shell 32 and the core 24, heating of the core 24 will continue due to conduction. The degree to which the core 24 increases in temperature is dependent on a variety of factors, including but not limited to the proximity of the core 24 to the shell 32 (in the case of convective heat transfer) and the thermal conductivity of the core 24. Such temperature increase may result in expansion of the core 24, with the extent of such expansion being dependent on, upon other things, the coefficient of thermal expansion of the core. The extent and rate of such expansion will in part determine the temperature at which interference first occurs between the core 24 and the shell 32 as the shell 32 cools.

Such expansion also dictates that, in a preferred method of assembly, the shell 32 is heated to a temperature well above (not simply equal to or slightly above) the minimum interference-free fit temperature. Such an "overshoot" is desirable to ensure that the core 24 can be dropped all the way into the shell 32 before interference occurs therebetween as the core 24 heats/expands and the shell 32 concurrently cools/shrinks. That is, it is preferred that the topmost temperature be significantly greater than the minimum interference-free fit temperature.

In the preferred assembly method, the topmost temperature is preferably about seven hundred (700) ° F.

It is permissible according to some aspects of the present invention, however, for the assembly process to be such that no overshoot of the minimum interference-free fit is necessary. For instance, both the elevated temperature of the shell and the ambient temperature of the stator core might be actively maintained so as to allow the shell to be positioned about the core without increasing the shell temperature past the minimum interference-free fit temperature.

As will be apparent to one of ordinary skill in the art based on the preferred assembly method described above, the shell 32, including the groove-defining portions 112, preferably comprises a material that expands when heated and shrinks when cooled (e.g., as opposed to a negative thermal expansion material that contracts when heated and expands when cooled). It is permissible according to some aspects of the present invention, however, for either or both of the shell and the stator core to be formed of a negative thermal expansion material.

Although it is preferred that the entire shell 32 be heated and cooled, it is alternatively permissible for only the groove-defining portions thereof to be heated and cooled. That is, the fins and other structures unrelated to interengagement of the shell and the stator core might, in an alternative method, remain thermally undisturbed or only incidentally thermally altered. Furthermore, the groove-defining portions and, in turn, the grooves might alternatively be unevenly spaced apart. Yet further, it is permissible according to some aspects of the present invention for only a single groove-defining portion and groove to be provided. Likewise, as noted previously, the ribs might alternatively be unevenly spaced apart, or only one rib might be provided.

Although passive cooling of the shell 32 to the minimum interference-free fit temperature and then to the ambient temperature is preferred, it is permissible according to some aspects of the present invention for the shell to instead be actively cooled (e.g., by means of a cryogen, cool air, quenching, etc.) to decrease production time. Furthermore, cooling of the shell may take place in distinct stages. For instance, the shell might be actively cooled to the minimum interference-free fit temperature, then allowed to passively cool to the ambient temperature.

In a preferred embodiment, the fit of the stator core 24 and the shell 32 (including the ribs 86 in the grooves 114 and the outer radial surface 84 against the inner shell surface 110) is a slip fit immediately after heating of the shell 32 to the topmost temperature (and prior to its cooling). As noted previously, the fits are preferably interference fits after the shell 32 has cooled to the ambient temperature (or, more broadly, to a temperature that is less than the minimum interference-free fit temperature).

It is permissible according to some aspects of the present invention, however, for the fits to vary from the preferred fits described above. For instance, according to some aspects of the present invention, the ribs might initially be received in the grooves in a transition or location fit rather than a slip fit, and/or the final fit between the radially outer face 84 and the inner shell surface 110 might be a transition fit rather than an interference fit. Furthermore, it is permissible according to some aspects of the present invention for the fit to vary between the rib/groove interface and the inner and outer circumferential faces interface. For instance, the ribs might be received in an interference fit after cooling, while the inner and outer circumferential faces engage via a location fit or transition fit.

Preferably, prior to the heating step, the outer diameter of the stator core 24 is between about seven and four thousand, seven hundred sixty ten-thousandths (7.4760) inches and seven and four thousand, eight hundred ten-thousandths (7.4800) inches. Most preferably, the outer diameter of the stator core 24 is seven and four thousand, seven hundred eighty ten-thousandths (7.4780) inches. Preferably, the inner diameter of the shell 32 is between about seven and four thousand, six hundred ninety ten-thousandths (7.4690) inches and seven and four thousand, seven hundred thirty ten-thousandths (7.4730) inches. Most preferably, the inner diameter of the shell 32 is seven and four thousand, seven hundred ten ten-thousandths (7.4710) inches. That is, slip-fit assembly of the shell onto the core would not be possible without relative expansion of the shell and/or contraction of the core.

The ribs 86 are preferably formed of a rib material having a rib thermal expansion coefficient, while the groove-defining portions 112 are preferably formed of a groove-defining portion material having a groove-defining portion thermal expansion coefficient. The rib material is preferably different than the groove-defining portion material, such that the ribs 86 and the groove-defining portions 112 have differing coefficients of thermal expansion.

Preferably, both materials are metals, although non-metal materials may be used within the ambit of some aspects of the present invention. More particularly, in a preferred embodiment, the groove-defining portions 112 comprise aluminum, while the ribs 86 comprise steel. The groove-defining portion thermal expansion coefficients are thus different from and, more particularly, greater than the rib thermal expansion coefficients.

In a preferred embodiment, each groove-defining portion 112 has a groove-defining portion thermal expansion coefficient between about eleven millionths (0.000011) in/in ° F. and fourteen millionths (0.000014) in/in ° F. Most preferably, each groove-defining portion has a groove-defining portion thermal expansion coefficient of about one hundred twenty-six ten-millionths (0.0000126) in/in ° F. In contrast, each rib 86 preferably has a rib thermal expansion coefficient between about fifty-five ten-millionths (0.0000055) in/in ° F. and eighty-five ten-millionths (0.0000085) in/in ° F. Most preferably, each rib has a rib thermal expansion coefficient of about sixty-eight ten-millionths (0.0000068) in/in ° F.

In a preferred embodiment, the thermal expansion coefficients of the shell 32 and stator core 24 are at least substantially constant throughout the shell 32 and the stator core 24, respectively. For instance, the rib thermal expansion coefficients are preferably at least substantially equal to a single thermal expansion coefficient associated with the remainder of the stator core 24 (including the yoke 70, the teeth 72, etc.) Similarly, the groove-defining portion thermal expansion coefficients are at least substantially equal to a single one associated with the remainder of the shell 32 (including the shell fins 67, etc.).

It is permissible according to some aspects of the present invention, however, for material variations resulting in gradients or other variations in the thermal expansion coefficients to be present. For instance, the fins of the shell might comprise a different grade of aluminum than the groove-defining portions of the shell and therefore have a different thermal expansion coefficient, or the ribs of the stator core might be formed of a different material than the yokes and teeth of the stator core.

As noted previously, the ribs 86 preferably are formed of a different material than the groove-defining portions 112. More broadly, the shell 32 in its entirety preferably comprises a different material than the stator core 24 as a whole, such that the stator core 24 and the shell 32 have differing coefficients of thermal expansion. Preferably, both materials are metals, although non-metal materials may be used within the ambit of some aspects of the present invention.

More particularly, in a preferred embodiment, the shell 32 in its entirety comprises aluminum, while the stator core 24 in its entirety comprises steel. The shell thermal expansion coefficient is thus different from and, more particularly, greater than the stator core thermal expansion coefficient.

With particular respect to the dimensions of the ribs 86 and the grooves 114, it is preferable that each groove 114 present a cross-sectional dimension that is equal to or smaller than a corresponding rib 86 dimension when the associated groove-defining portion 112 has yet to be heated (i.e., the temperature of the groove-defining portion is below and has yet to exceed the minimum interference-free fit temperature). That is, the cross-sectional dimension of each groove 114 is preferably equal to or smaller than the cross-sectional dimension of the associated rib 86 before the assembly process has begun.

The cross-sectional dimension of each groove 114 is preferably greater than the cross-sectional dimension of the associated rib 86 when the associated groove-defining portion 112 is at the topmost temperature or at a temperature that is greater than or equal to the minimum interference-free fit temperature. That is, the cross-sectional dimension of each groove 114 is preferably greater than the cross-sectional dimension of the associated rib 86 just prior to relative axial shifting of the stator core 24 and the shell 32.

As noted previously, however, it is also preferred that radially outward shifting of the grooves 114 relative to the ribs 86 occurs as the shell 32 expands, with such shifting providing at least partial radial clearance between the ribs 86 and the grooves 114 (i.e., regardless of whether or not the cross-sectional groove dimension increases beyond that of the associated rib).

The cross-sectional dimension of each groove 114 is preferably equal to the cross-sectional dimension of the associated rib 86 when the temperature of the associated groove-defining portion 112, having already been elevated to the topmost temperature (i.e., having already been greater than or equal to the minimum interference-free fit temperature), has subsequently dropped below the minimum interference-free fit temperature (e.g., to the ambient temperature). That is, the cross-sectional dimension of each groove 114 is preferably equal to the cross-sectional dimension of the associated rib 86 when the shell 32 is fitted on the core 24.

With particular respect to the geometries of the ribs 86 and the grooves 114, it is preferable that the ribs 86 and the grooves 114 have corresponding cross-sectional shapes. Most preferably, both the ribs 86 and the grooves 114 have semicircular cross-sectional shapes.

As noted previously, in a preferred method of assembly, only the shell 32 is actively heated as part of the assembly process. That is, the stator core 24 is initially at an ambient temperature and only deviates from this temperature due to interaction with the (warmer) shell 32. However, it is permissible for some aspects of the present invention for both the core and the shell to be actively heated. In such an alternative, enablement of the slip fit after heating is reliant on initial dimensional variations and/or sufficient variation between the core thermal expansion coefficient and the shell thermal expansion coefficient. For instance, both the core and the shell might be actively heated, but with the shell being heated more than the core.

Yet further, it is permissible according to some aspects of the present invention for the interconnection to instead be achieved via initial cooling of the core. For instance, the core could be initially cooled so as to shrink relative to the shell, then allowed to warm and expand to achieve the desired interference fit. Alternatively, both cooling of the core and cooling of the shell could be utilized, or the core could be cooled while the shell is heated.

In a preferred embodiment, the shell 32 and stator core 24 materials, dimensions, and fits are chosen in such a manner that the shell 32 and the stator core 24 do not separate as a result of temperature fluctuations associated with motor operation. For instance, in a preferred embodiment, the motor 10 is configured to operate at or between minimum and maximum operating temperatures of about sixty-five (65) ° F. and two hundred (200) ° F., respectively. The ribs 86 and the groove-defining portions 112 are preferably configured such that the interference fit of the rib 86 in the groove 114 is maintained when the temperatures of the stator core 24 and the shell 32 are at or between the minimum and/or maximum operating temperatures.

It is permissible, however, for the shell and stator core materials and dimensions to be chosen in such a manner that the shell may be removed from the stator core upon heating of one or both components to a suitably high temperature or temperatures. For instance, the shell might be intentionally heated relative to the stator core to enable removal of the shell, or both the shell and the stator core might be heated for the same purpose. Such removability is not a requirement of some aspects of the present invention, however.

In preferred embodiment, the shell 32 and the stator core 24 are interconnected solely by means of the heating, shifting, and cooling steps. That is, no secondary retention is provided, with the interconnection being solely by means of the interference fit between the ribs 86 and the groove-defining portions 112 and between the core 24 and the shell 32 in a broad sense. However, it is permissible according to some aspects of the present invention for additional securement means to be utilized. For instance, a pair of spaced apart pins might extend through the shell and into the core, or a retaining ring or spring clip might be secured to the inner shell surface in such a manner as to present a shoulder for restricting axial movement of the stator core.

Preferably, the endcaps 102 and wiring 100 are provided on the stator core 24 prior to assembly of the stator core 24 and the shell 32. It is permissible, however, for the endcaps and wiring to be provided later in the assembly process.

It is also preferable that the rotor 12 is positioned relative to the stator 14 after interconnection of the stator core 24 and the motor shell 32 is complete. More particularly, the stator 14 and the rotor 12 are preferably shifted relative to each other such that the stator 14 at least substantially circumscribes the rotor 12.

As noted previously, the motor 10 preferably includes a rotor 12. The rotor 12 preferably includes a rotor core 16, a plurality of magnets 18, a shaft assembly 20, and a retention structure 22.

The rotor core 16 preferably comprises a plurality of pole segments 116 arranged arcuately about the shaft assembly 20. Similarly, the magnets 18 are preferably arranged arcuately about the shaft assembly 20. In a preferred embodiment, as illustrated, the pole segments 116 alternate with the magnets 18, such that each of the magnets 18 is at least in part interposed between adjacent pole segments 116.

Preferably, the pole segments 116 are evenly arcuately arranged. Similarly, the magnets 18 are preferably evenly arcuately arranged. Yet further, each magnet 18 is preferably centrally positioned between adjacent pole segments 116. Each magnet 18 is also preferably in direct contact with adjacent ones of the pole segments. It is permissible according to some aspects of the present invention, however, for uneven arrangements or variably spaced arrangements to be used.

In a preferred embodiment, eight (8) pole segments and eight (8) magnets 18 are provided, such that the motor 10 is a twelve (12) slot, eight (8) pole motor. However, it is permissible according to some aspects of the present invention for other numbers of slots and poles achieving a preferred three (3) slot:two (2) pole ratio to be present. For instance, the motor might in an alternative embodiment include eighteen (18) slots and twelve (12) poles. Yet further, the motor may instead have an entirely different slot:pole ratio without departing from some aspects of the present invention.

The pole segments 116 preferably each comprise a magnetically conductive metallic material such as steel. It is permissible for any one or more of a variety of magnetically conductive materials to be used, however.

In a preferred embodiment, the pole segments 116 are spaced apart such that adjacent pole segments 116 do not contact each other. Magnetic flux is therefore not transferred directly between pole segments. It is permissible according to some aspects of the present invention, however, for contact between pole segments to occur (e.g., by means of one or more bridges or other interconnecting elements). Furthermore, in such an alternative embodiment, contact between pole segments may allow for negligible transfer of magnetic flux (e.g., that transferred via a strategically positioned, very thin bridge) or significant flux transfer (e.g., that transferred via an oppositely strategically positioned thick interconnecting beam).

Each pole segment 116 preferably comprises a plurality of laminations (not shown). It is also permissible, however, for each pole segment 116 to be a monolithic (i.e., non-laminated) structure.

Figure 12:
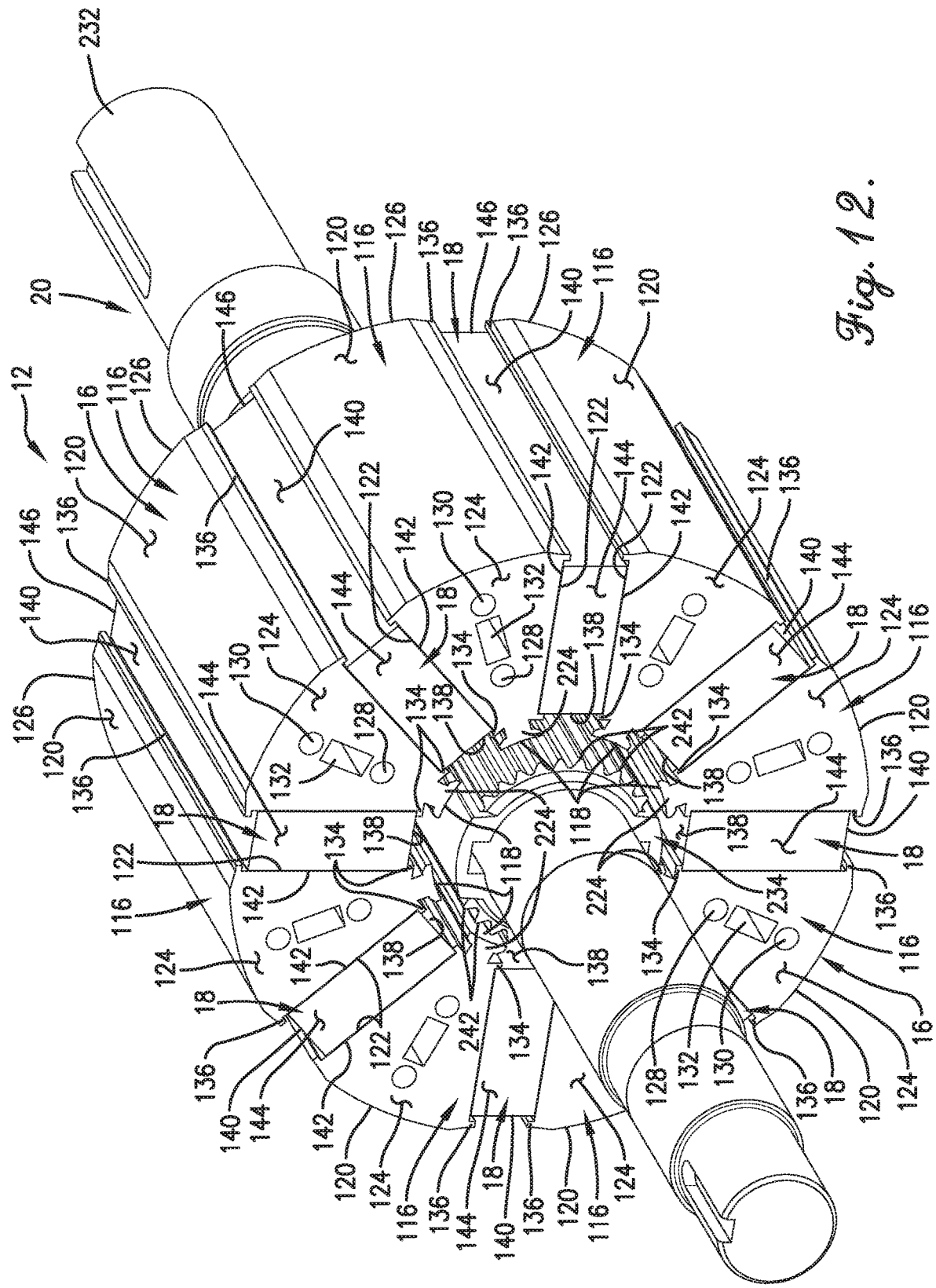
FIG. 12 is a perspective view of the rotor of FIGS. 1, 2, 7, 8, and 11, with the overmolding removed.

In a preferred embodiment and as best shown in FIG. 12, each pole segment 116 preferably includes a radially innermost face 118, a radially outermost face 120, and a pair of side walls 122. Each pole segment 116 further preferably presents axially spaced apart front and back faces 124 and 126.

Radially spaced apart inner and outer positioning openings 128 and 130, respectively, preferably extend continuously through each pole segment 116 from the front face 124 to the back face 126. A securement opening or slot 132 also preferably extends therethrough. The securement slot 132 is preferably positioned radially between the inner and outer positioning openings 128 and 130, respectively.

More or fewer slots or openings may be provided without departing from the scope of some aspects of the present invention, however. Furthermore, such slots or openings may alternatively extend only part of the way through the corresponding pole segment and/or be alternatively positioned. Yet further, the shape of the slots may also be varied.

Each pole segment 116 also preferably includes magnet-positioning structure. The magnet-positioning structure preferably includes a pair of arcuately spaced apart, oppositely circumferentially outwardly projecting radially innermost tabs 134 and a corresponding pair of arcuately spaced apart, oppositely circumferentially outwardly projecting radially outermost tabs 136. The innermost and outermost tabs 134 and 136 of adjacent pole segments 116 preferably cooperatively restrict radial displacement of corresponding ones of the magnets 18.

In a preferred embodiment, the magnets 18 are permanent magnets. Furthermore, the magnets 18 preferably comprise ferrite. However, other magnet materials (e.g., neodymium) may be used without departing from the scope of the present invention.

Each magnet 18 is preferably generally cuboidal in form. More particularly, each magnet 18 preferably presents a radially innermost face 138, a radially outermost face 140, a pair of circumferentially spaced apart side faces 142, and axially spaced apart front and back faces 144 and 146, respectively. The faces 138, 140, 142, 144, and 146 are preferably at least substantially flat and arranged in a cuboidal manner. It is permissible according to some aspects of the present invention, however, for the magnet shapes to vary (e.g., via the provision of one or more curved faces and/or non-orthogonal interfaces between the faces).

The radially innermost face 138 of each magnet 18 preferably abuts one of the radially innermost tabs 134 of each of the adjacent pair of pole segments 116. As will be discussed in greater detail below, the radially outermost faces 140 are preferably spaced from but adjacent one of the radially outermost tabs 136 of each of the adjacent pair of pole segments 116. Furthermore, each of the side faces 142 preferably directly abuts a corresponding one of the pole segment side walls 122. Thus, circumferential and radial shifting of each magnet 18 is at least substantially restricted by the adjacent pole segments 116.

In a preferred embodiment, each magnet 18 is preferably oriented such that its polarity is oriented generally tangentially. Furthermore, the directions of polarity of the magnets 18 are preferably alternated. More particularly, the north pole of a first one of the magnets 18 preferably faces the north pole of a second one of the magnets 18, etc. That is, each pole segment 116 preferably abuts only like poles of the adjacent magnets 18, with the poles segments 116 therefore alternating in polarity.

It is permissible according some aspects of the present invention, however, for alternatively oriented and/or arranged magnets to be provided.

As noted previously, the rotor 12 preferably includes a retention structure 22. The retention structure 22 preferably secures the pole segments 116 relative to each other and the magnets 18 relative to each other. Furthermore, the retention structure 22 preferably secures the pole segments 116 and the magnets 18 to each other.

In a preferred embodiment, the retention structure 22 is formed of a magnetically insulative material, such that no magnetic flux or only negligible magnetic flux (e.g., the flux corresponding to a flux density of fifteen (15) mT or less) flows therethrough. More particularly, the retention structure 22 preferably supports and positions the pole segments 116 and the magnets 18 in such a manner as to magnetically isolate the pole segments 116.

As noted previously, the pole segments 116 are also preferably spaced apart such that flow of magnetic flux therebetween is avoided. The pole segments 116 are also preferably not interconnected by any magnetically conductive material. Even more preferably, as will be discussed in greater detail below, the pole segments 116 are not connected to the shaft assembly 20 by electrically conductive material.

It has been determined that magnetic isolation of the pole segments 116 provides numerous advantages. Among other things, for instance, magnetic isolation of the pole segments 116 results in concentration of the magnetic flux and reduced flux leakage, which in turn results in higher power density.

In a preferred embodiment, the retention structure 22 comprises a synthetic resin material. It is permissible according to some aspects of the present invention, for part or all of the retention structure to instead comprise an alternative at least substantially magnetically insulative material. For instance, the retention structure might include an aluminum bracket securing the pole segments and magnets, as well as an overmolded shell supporting the bracket.

Yet further, a portion of the retention structure that does not engage the pole segments and/or the magnets might alternatively be formed of a magnetically conductive material. Such portion would not interfere with the desired magnetic isolation of the pole segments.

All in all, any one or more of a variety of materials capable of enabling the features and qualities described herein (e.g., magnetic shielding capability, structural rigidity, etc.) may be used to form the retention structure without departing from some aspects of the present invention.

Preferably, however, as will be discussed in greater detail below, the retention structure 22 comprises a body 148 overmolded over at least portions of the pole segments 116 and the magnets 18 so as to secure the pole segments 116 relative to each other, the magnets 18 relative to each other, and the pole segments 116 and magnets 18 relative to each other.

Such body 148 preferably is formed of a magnetically insulative material (e.g., a plastic) that is an least somewhat flowable (or at least malleable) composition capable of being molded into a rigid, self-sustaining body providing the necessary retention capabilities described above. The compositions for overmolding according to the invention will generally include a synthetic resin, such as an organic polymeric or oligomeric resin that is capable of hardening or crosslinking during the overmolding process. In many instances, the composition will also include a crosslinking agent and/or a catalyst to initiate crosslinking, since a thermosetting plastic is typically preferred.

The body 148 is preferably formed by use of a mold 150, shown schematically in FIGS. 7-10. The mold 150 preferably includes upper and lower end plates 152 and 154 and a plurality of arcuately arranged slides 156.

Figure 10:
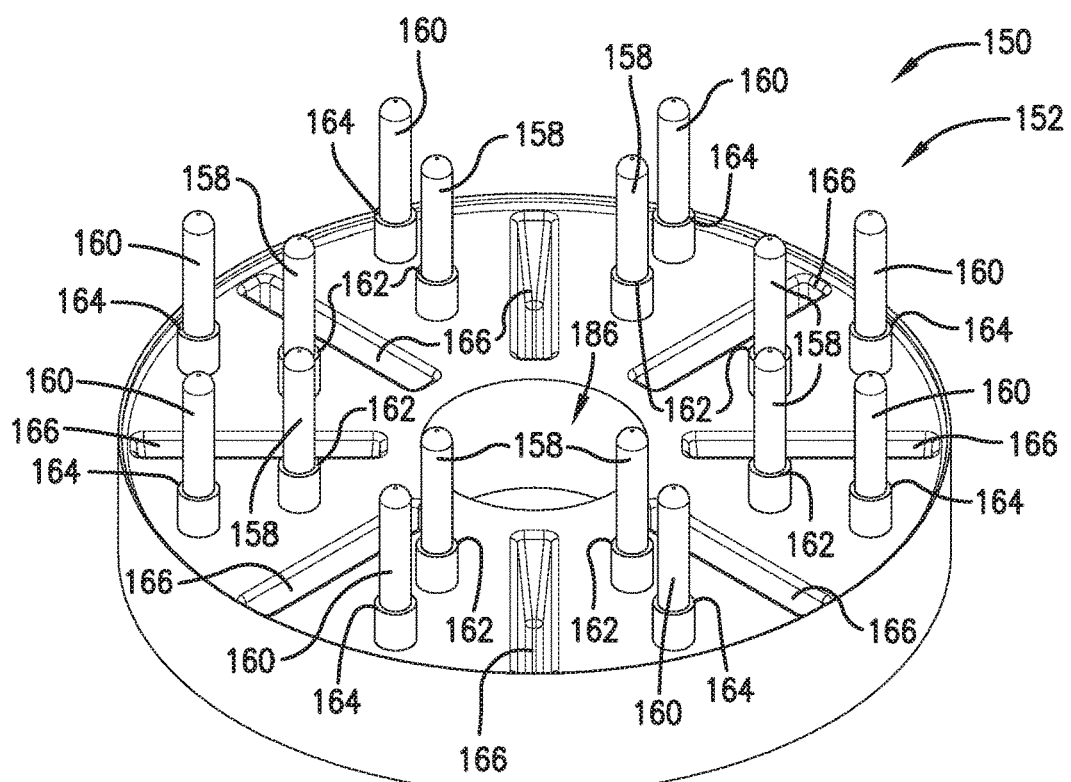
FIG. 10 is a bottom perspective view of the upper plate of the mold of FIGS. 7 and 8.

As best shown in FIG. 10, the upper end plate 152 preferably includes radially inner and outer pluralities of evenly arcuately spaced apart axially extending pegs 158 and 160, respectively. The radially inner pegs 158 preferably present respective shoulders 162, while the radially outer pegs 160 preferably present respective shoulders 164. The upper end plate 152 further preferably includes a plurality of evenly arcuately spaced apart troughs 166.

Figure 9:
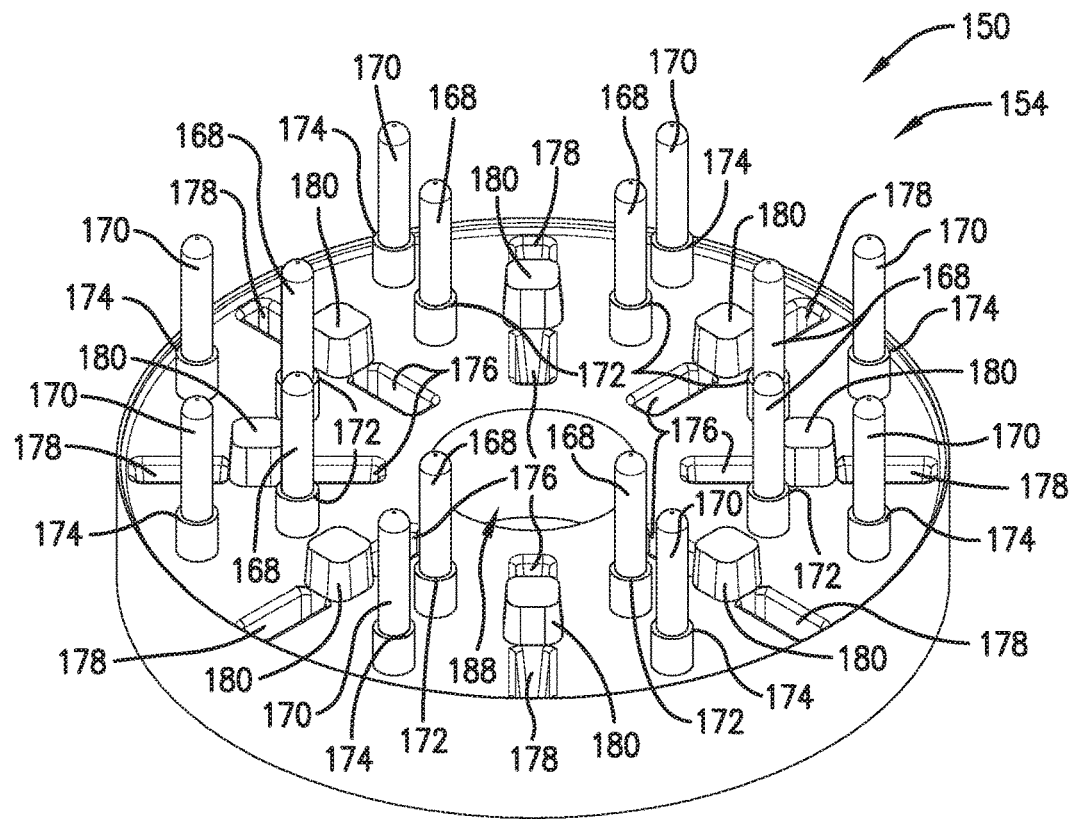
FIG. 9 is a top perspective view of the lower plate of the mold of FIGS. 7 and 8.

As best shown in FIG. 9, the lower end plate 154 preferably includes radially inner and outer pluralities of evenly arcuately spaced apart axially extending pegs 168 and 170, respectively. The radially inner pegs 168 preferably present respective shoulders 172, while the radially outer pegs 170 preferably present respective shoulders 174. The lower end plate 154 further preferably includes evenly arcuately spaced apart radially inner and outer pluralities of troughs 176 and 178, respectively. Yet further, the lower end plate 154 preferably includes a plurality of evenly arcuately spaced apart platforms 180 positioned between respective pairs of the troughs 176 and 178.

Figure 8:
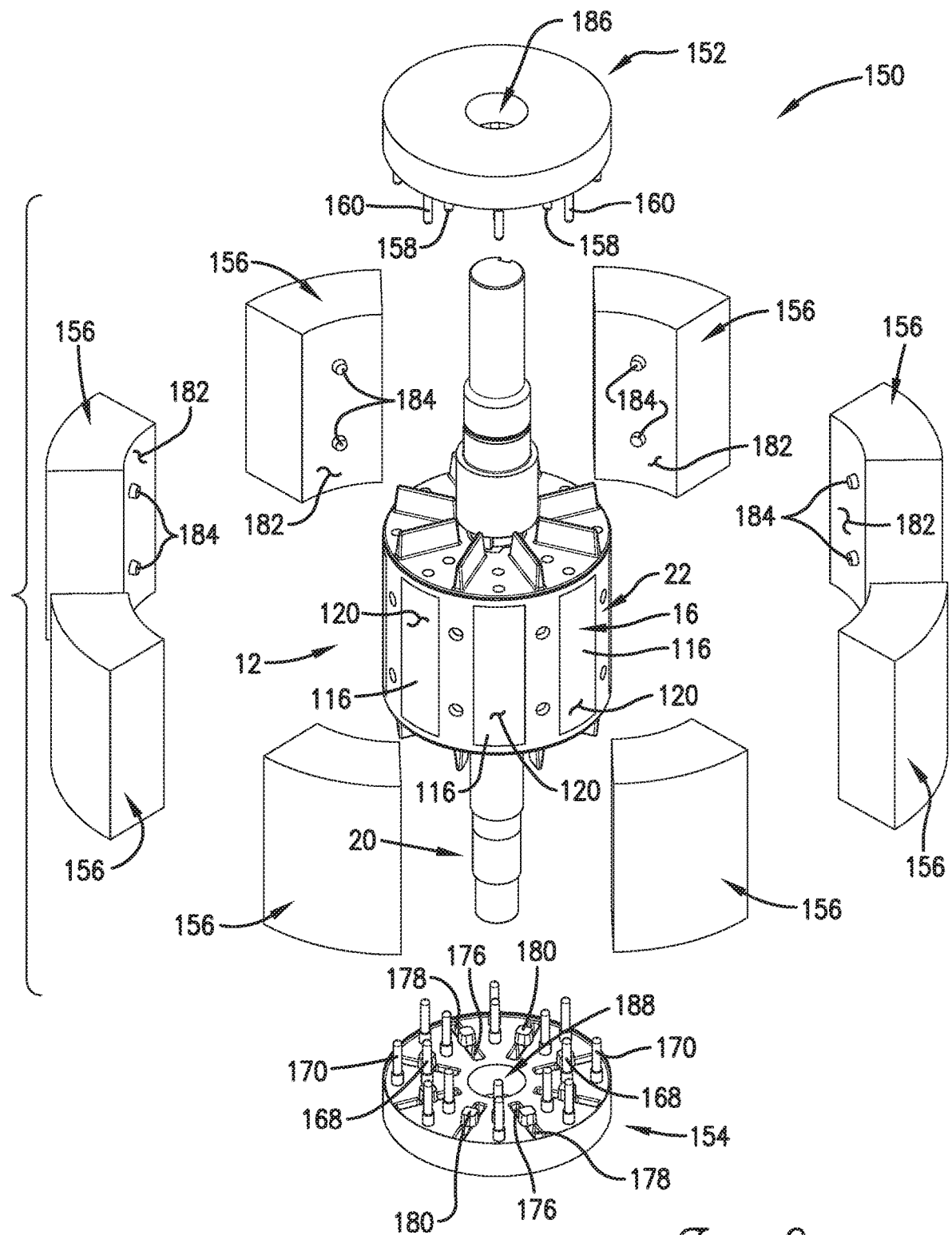
FIG. 8 is an axially and radially exploded perspective view of the rotor and mold of FIG. 7.

As best shown in FIG. 8, the slides 156 each preferably present a smooth, arcuately extending inner face 182 and a pair of axially spaced apart, radially inwardly spring-biased nibs 184 extending radially inwardly from each inner face 182. Preferably, eight (8) slides 156 are provided and correspond with the preferred eight (8) magnets 18 and eight (8) pole segments 116.

In a preferred method of assembly of the rotor 12, each pole segment 116 is initially positioned on the lower end plate 154. The magnets 18 are then positioned on the lower end plate 154 so as to be alternately arcuately arranged with the magnets 18. The slides 156 are positioned so as to engage respective ones of the pole segments 116 and the magnets 18 (see FIG. 7), and the other of the upper end plates is positioned so as to engage the already positioned pole segments 116 and magnets 18.

More particularly, each pole segment 116 is preferably positioned on the lower end plate 154 such that the pegs 168 and 170 extend through the inner and outer positioning openings 128 and 130, respectively, and the back face 126 rests on the shoulders 172 and 174 of the respective pegs 168 and 170.

The magnets 18 are then alternately inserted between the pole segments 116 such that the magnet side faces 142 engage corresponding ones of the pole segment side walls 122, the innermost faces 138 of the magnets 18 engage corresponding ones of the innermost tabs 134 of the pole segments 116 due to spring forces provided by the nibs 184, and the back faces 146 of the magnets 18 rest on corresponding ones of the platforms 180 and overhang corresponding inner and outer troughs 176 and 178 of the lower end plate 154.

The slides 156 are positioned so as to circumscribe the pole segments 116 and the magnets 18, with the nibs 184 preferably contacting the radially outermost faces 140 of the magnets 18 and with the inner faces 182 of the slides 156 contacting the radially outermost pole segment faces 120.

The upper end plate 152 is placed such that the pegs 158 and 160 extend in the opposite direction through the respective pole segment positioning openings 128 and 130, with the front face 124 of each pole segment 116 resting on the shoulders 162 and 164 of the respective pegs 158 and 160. Furthermore, the front faces 144 of the magnets 18 extend below the corresponding troughs 166 of the upper end plate 152.

In a preferred embodiment, the upper and lower end plates 152 and 154 each include respective shaft-receiving openings 186 and 188. As will be discussed in greater detail below, the shaft assembly 20 is also positioned relative to the mold 150 prior to molding, with the shaft assembly 20 extending in part through each of the shaft-receiving openings 186 and 188.

The retention structure material is preferably injected into the mold 150 by any means known in the art to create the overmolded body 148.

Figure 14:
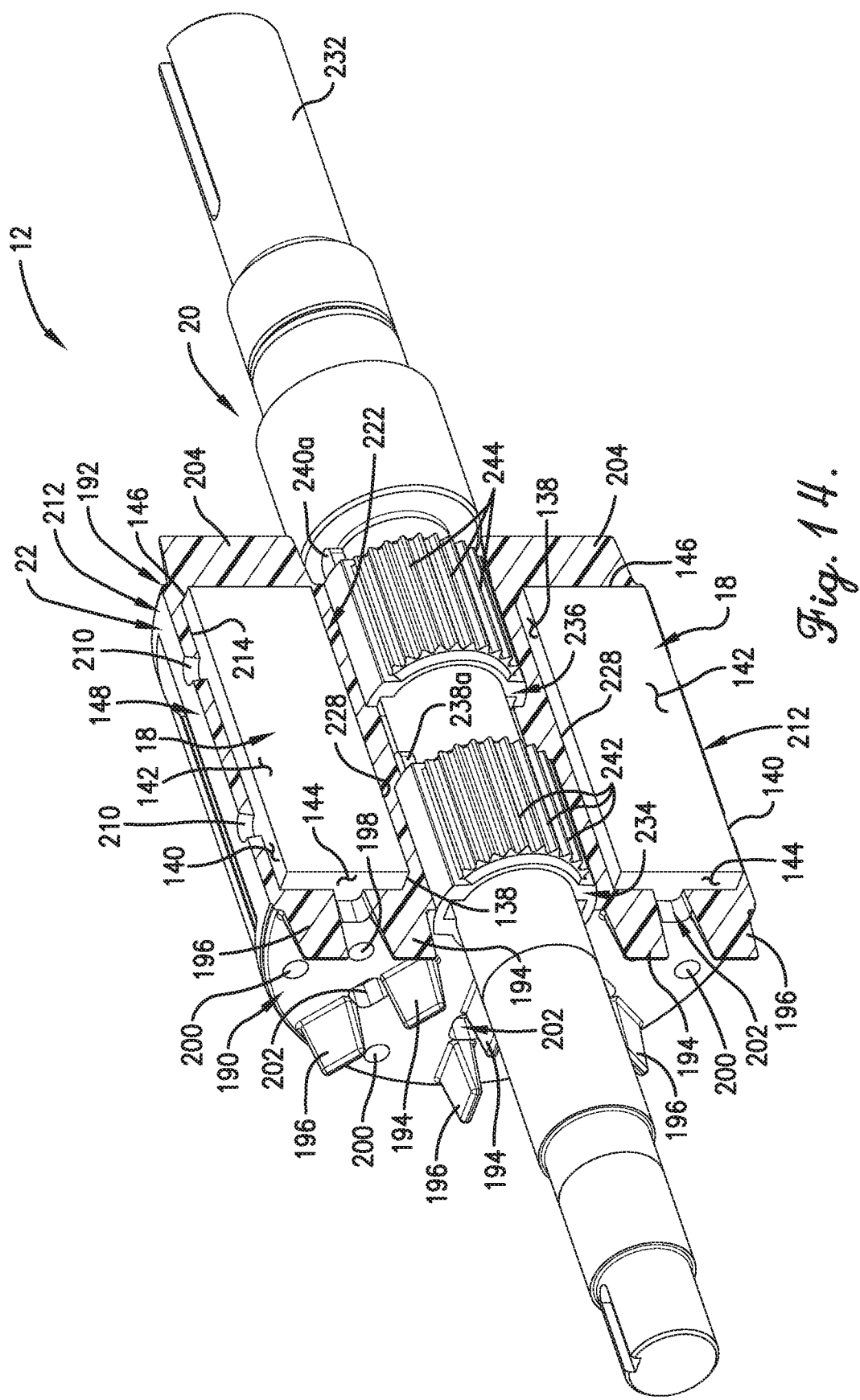
FIG. 14 is a partially sectioned front perspective view of the rotor of FIGS. 1, 2, 7, 8, 11, and 13.

The body 148 preferably includes a front end 190 and a rear end 192. As best shown in FIG. 14, the front end 190 preferably includes radially innermost and outermost pluralities of front fins 194 and 196 corresponding to the inner and outer troughs 176 and 178 of the lower end plate 154. The front end 190 further preferably defines radially innermost and outermost pluralities of access holes 198 and 200, respectively corresponding to the pegs 168 and 170 of the lower end plate 154. Yet further, the front end 190 defines a plurality of recesses 202 corresponding to the platforms 180 of the lower end plate 154.

Figure 16:
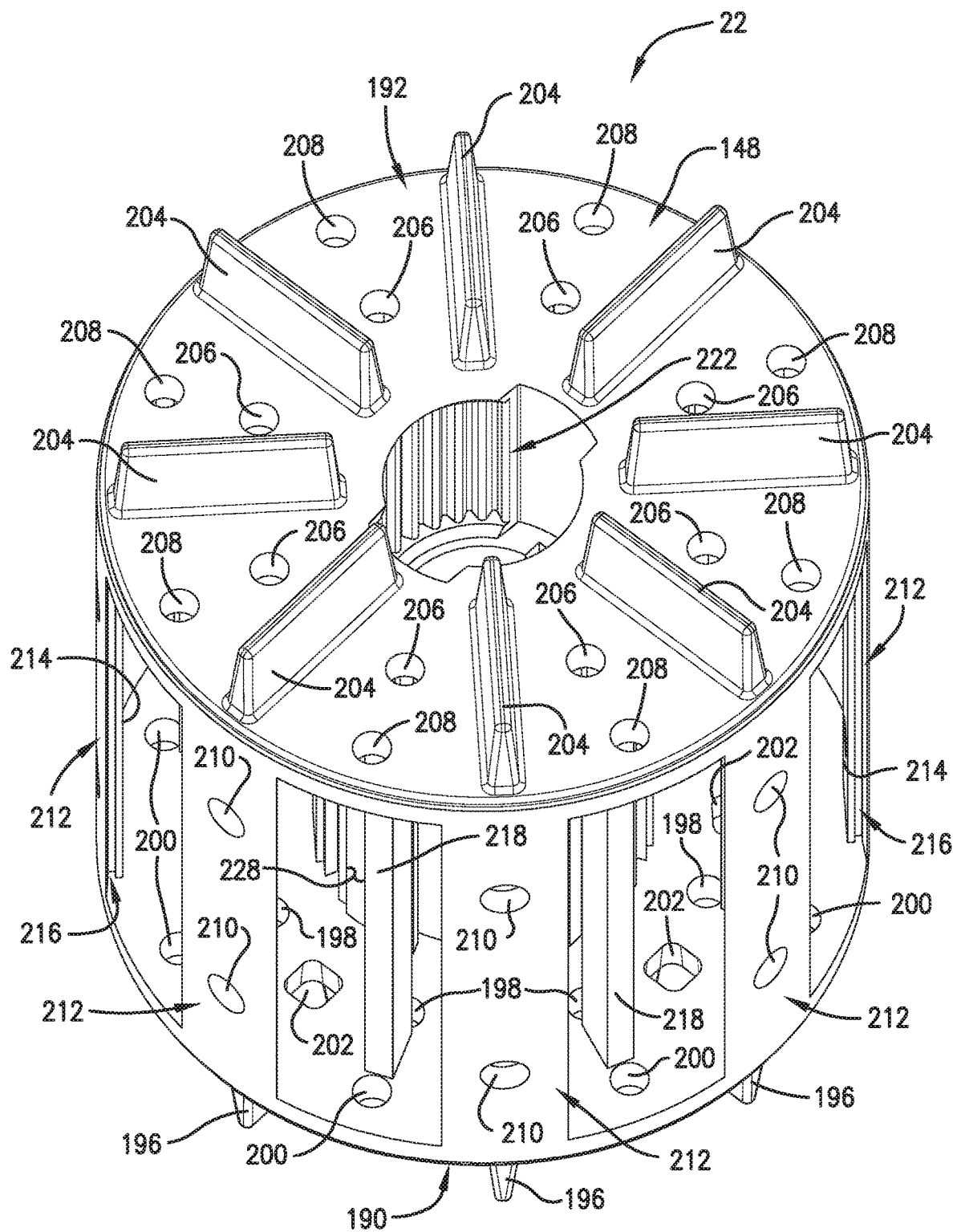
FIG. 16 is a front perspective view of the rotor overmolding of FIGS. 1, 2, 7, 8, 11, 13, and 14.

As best shown in FIG. 16, the rear end 192 preferably includes a plurality of rear fins 204 corresponding to the troughs 166 of the upper end plate 152. The rear end 192 further includes radially innermost and outermost pluralities of access holes 206 and 208 corresponding to the pegs 158 and 160, respectively, of the upper end plate 152.

As also best shown in FIG. 16, the body 148 further preferably includes a plurality of side portals 210 extending through a corresponding plurality of retention columns 212. The side portals 210 are preferably formed by the nibs 184 of the slides 156 during the molding procedure.

Figure 13:
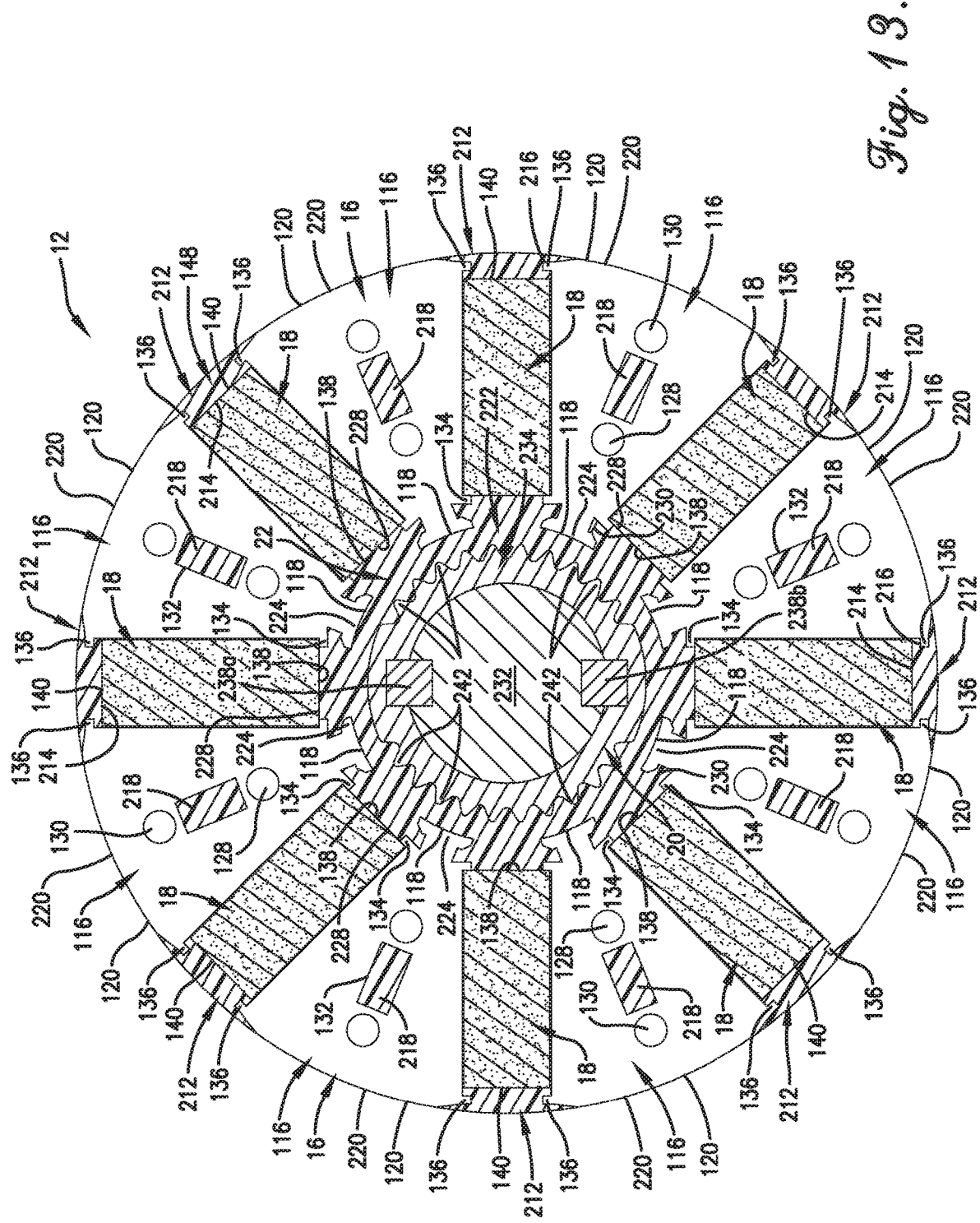
FIG. 13 is a cross-sectional view of the rotor of FIGS. 1, 2, 7, 8, and 11 taken along line 13-13 of FIG. 11.
Figure 17:
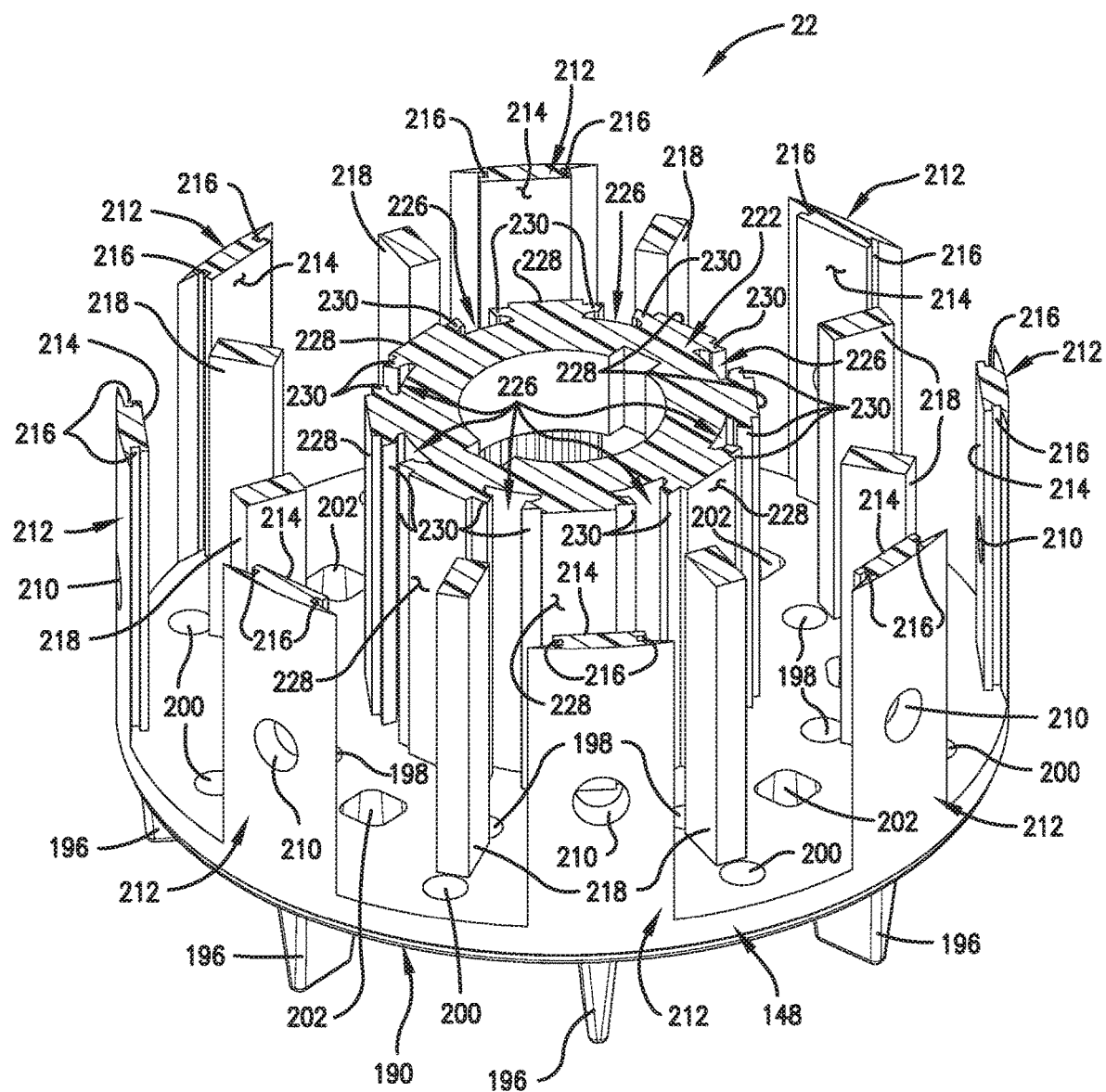
FIG. 17 is a cross-sectional front perspective view of the overmolding of FIG. 16.
Figure 18:
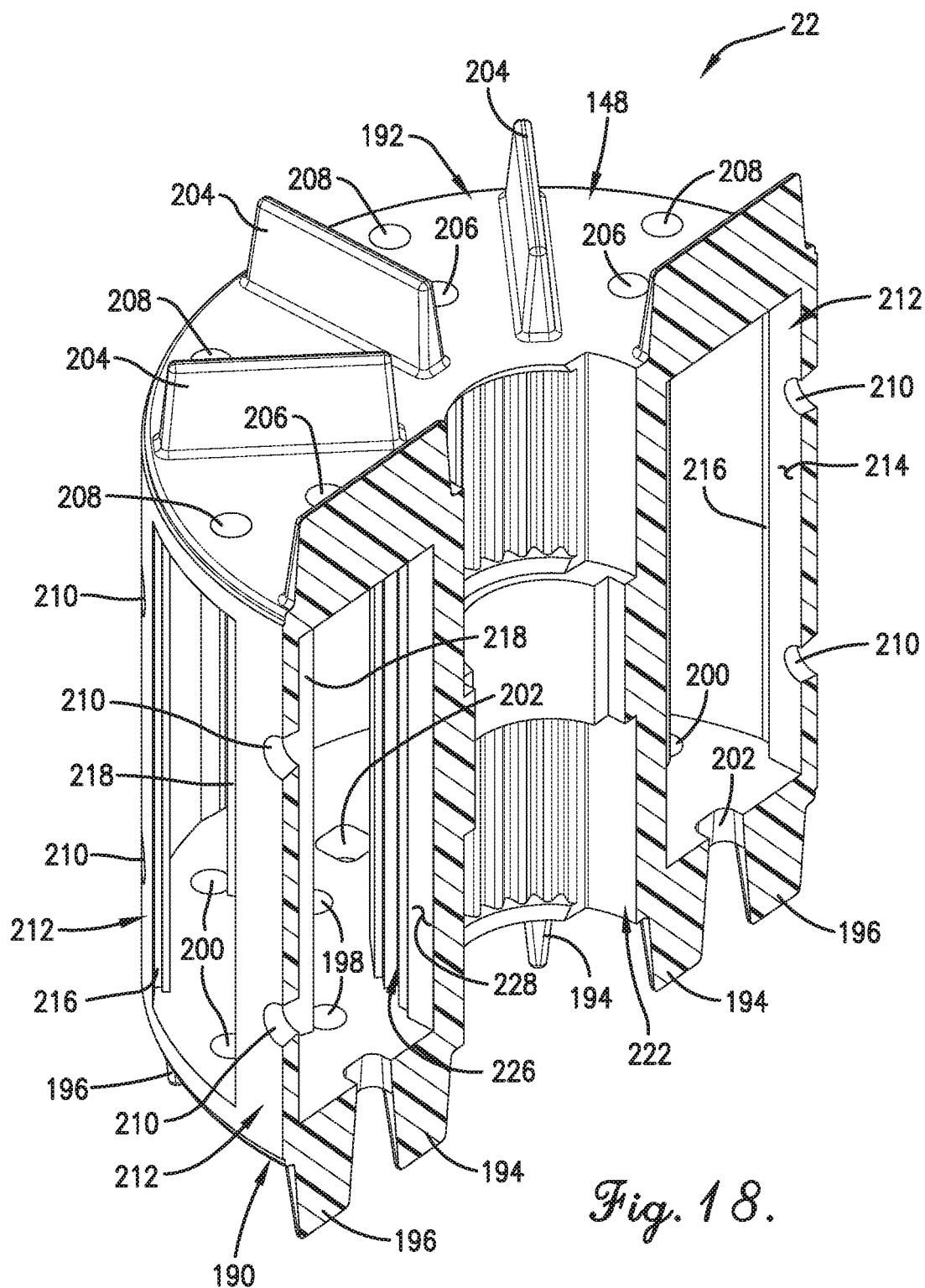
FIG. 18 is an alternatively sectioned cross-sectional front perspective view of the overmolding of FIGS. 16 and 17.

As best shown in FIGS. 13 and 17, the retention columns 212 each include an outer magnet-engaging face 214 for engaging the corresponding outermost magnet face 140 and a pair of tab-receiving slots 216 for receiving corresponding radially outermost tabs 136 of the adjacent pole segments 116.

Yet further, the body 148 preferably includes a plurality of generally axially extending protrusions 218. The protrusions 218 preferably each extend through a corresponding one of the securement slots 132 formed in the pole segments 116 to restrict radial and circumferential shifting thereof.

Figure 11:
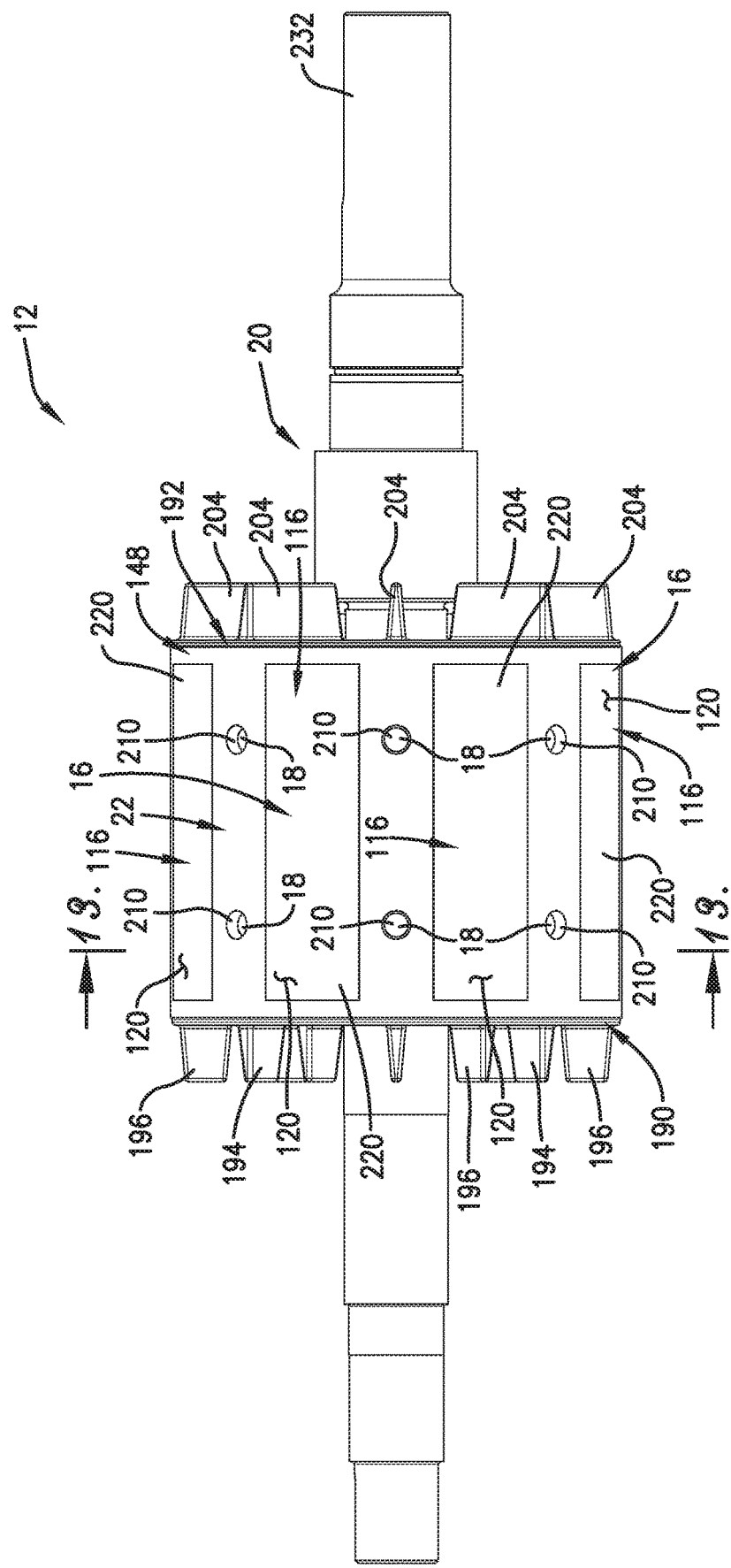
FIG. 11 is a side view of the rotor of FIGS. 1, 2, 7, and 8.

In a preferred embodiment and as shown in FIGS. 11, 13, and others, the aforementioned abutment of the slide inner faces 182 against the radially outermost faces 120 of the pole segments 116 is such that a portion 220 of each pole segment 116 remains exposed.

In a preferred embodiment, a hub 222 is preferably formed between the shaft assembly 20 and the pole segments 116/magnets 18.

As noted previously, the shaft assembly 20 preferably extends through the shaft-receiving openings 186 and 188 of the upper and lower end plates 152 and 154, respectively, prior to filling of the mold 150. More particularly, in a preferred embodiment, the body 148 is overmolded over part of the shaft assembly 20, with the hub 222 being part of the overmolded body 148. In such a preferred embodiment, the overmolded body itself at least in part secures the shaft assembly 20, the pole segments 116, and the magnets 18 to one another.

It is permissible according to some aspects of the present invention, however, for the hub to instead be formed exclusive of the overmolding process described above. For instance, the hub could be a discrete aluminum component interconnected to or fixed to the overmolded body by pins or adhesives, or such a component could be secured by the overmolding itself. In such an alternative embodiment, the overmolded body still at least in part secures the shaft assembly, the pole segments, and the magnets to one another, albeit in cooperation with one or more additional components.

In a preferred embodiment, each pole segment 116 interlocks with the hub 222 formed by the overmolded body 148. It is permissible according to some aspects of the present invention, however, for the interlocking to be at a non-hub location or at a non-overmolded hub (e.g., an aluminum hub as described above).

Preferably, such interlocking is by means of respective dovetail connections. More particularly, in a preferred embodiment, each pole segment 116 preferably includes a dovetail projection 224 that engages a corresponding dovetail recess 226 defined by the retention structure 22. Although it is preferable for the male dovetail projections to be provided on the pole segments and the corresponding recesses to be defined by the retention structure, it is permissible for the opposite to be true or for the projections and recesses to be distributed between the pole segments and the retention structure.

In keeping with the above-described alternative hub configurations, it is permissible for the dovetail recesses to be formed in a method other than overmolding. However, the dovetail recesses 226 are preferably part of the preferred overmolded hub 222 and formed during molding over of the pole segments 116. An excellent geometric match is thereby achieved between corresponding dovetail projections 224 and dovetail recesses 226.

Although dovetail interconnections are preferred, is noted that a variety of other interlocking forms known in the art may suitably be used. Yet further, it is permissible according to some aspects of the present invention for non-interlocking engagement to occur between the pole segments and the hub or, more broadly, the retention structure.

The hub 222 further preferably includes a plurality of inner magnet-engaging faces 228 for engaging the innermost magnet faces 138 and a pair of inner tab-engaging shoulders 230 engaging receiving corresponding radially innermost tabs 134 of the adjacent pole segments 116.

Although the above-described features are preferably part of the overmolded body 148, it is permissible according to some aspects of the present invention for some or all of such features to be formed by a non-overmolded retention structure or a non-overmolded portion or portions of a partially overmolded retention structure. For instance, a plastic mounting plate might be provided, with the magnets and pole segments being fastened or otherwise secured to the plate after the plate is formed.

Figure 15:
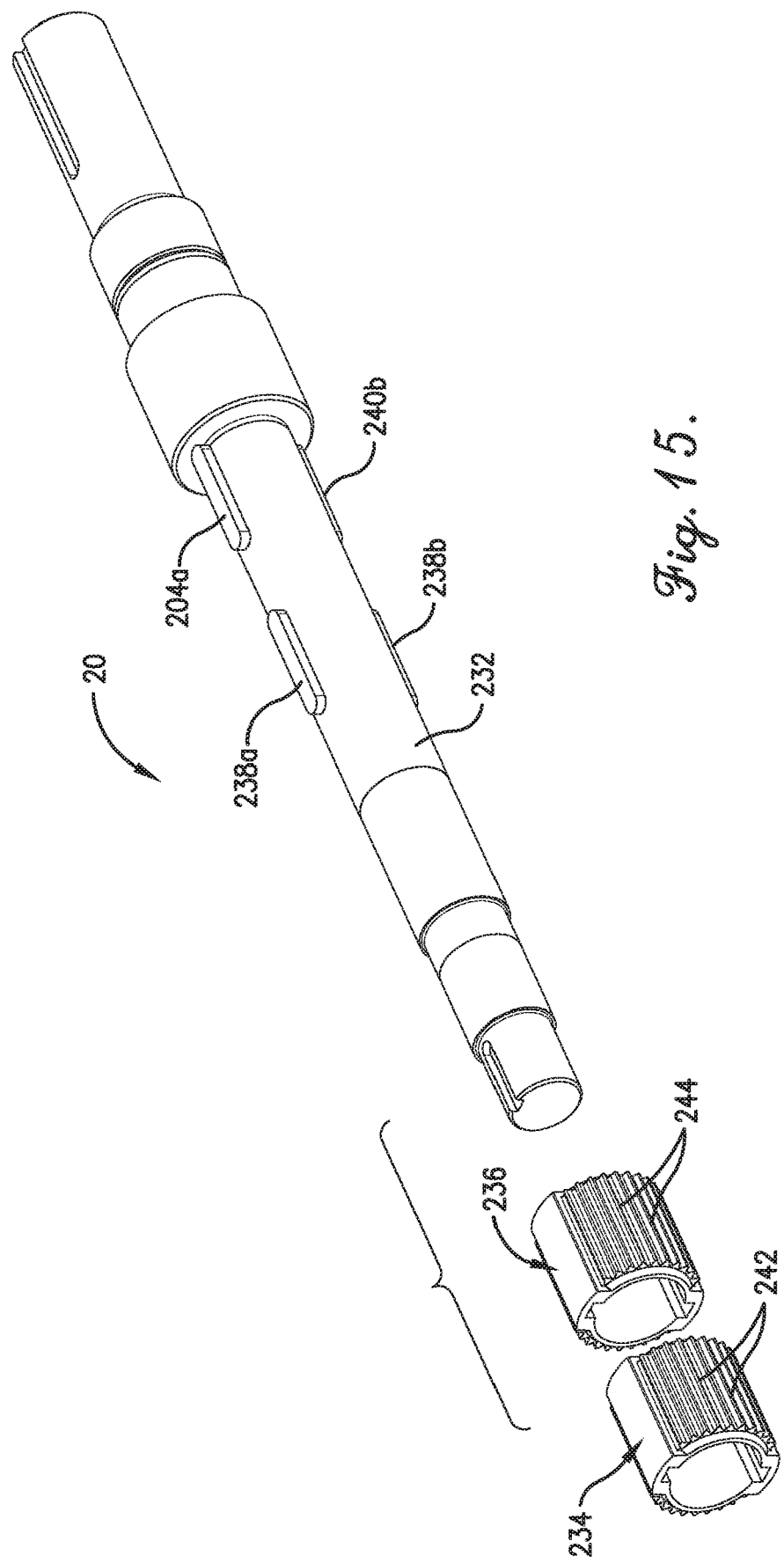
FIG. 15 is an axially exploded front perspective view of the shaft and couplers of the rotor of FIGS. 1, 2, 7, 8, 11, 13, and 14.

The shaft assembly 20 preferably engages the hub 222 such that the overmolded body 148 and the pole segments 116 and magnets 18 secured by the body 148 rotate with the shaft assembly 20. For instance, in a preferred embodiment illustrated in FIGS. 14, 15, and others, the shaft assembly 20 includes a shaft 232, a pair of coupling elements 234 and 236, and two (2) pairs of keys 238*a,b* and 240*a,b* interconnecting the shaft 232 and respective ones of the coupling elements 234 and 236. The coupling elements 234 and 236 are preferably interposed between the shaft 232 and the body 148 (or, most preferably, between the shaft 232 and the hub 222 of the body 148).

The coupling elements 234 and 236 each preferably present a plurality of radially outermost teeth 242 and 244, respectively that engage the hub 222. The teeth 242 and 244 are preferably splines, although other tooth forms (e.g., zig-zags, corrugations, knurls, etc.) are permissible without departing from the scope of the present invention.

As will be discussed in greater detail below, the shaft assembly may be alternatively configured. For instance, the shaft assembly might include more or fewer couplers or be devoid of couplers. Yet further, a different overmolded part or parts of the shaft assembly might present the teeth and engage the retention structure.

In a preferred embodiment, the shaft assembly 20 is electrically isolated from the pole segments 116. More particularly, in a preferred embodiment, the body 148 and the coupling elements 234 and 236 are at least in part formed of electrically insulative materials. As noted previously, the material forming the body 148 is preferably additionally magnetically insulative. For instance, in a preferred embodiment, the body 148 comprises a both magnetically and electrically insulative synthetic resin.

The coupling elements 234 and 236 preferably comprise aluminum (i.e., an electrically conductive material) powder-coated with an least substantially electrically insulative material. In such a preferred embodiment, structural advantages are provided due to use of metallic coupling elements. However, electrical isolation of the entire shaft assembly 20 is still retained due primarily to spacing of the shaft assembly 20 (including the metallic coupling elements 234 and 236) from the pole segments 116 by the electrically insulative body 148. Secondary electrical isolation is provided due to the electrically insulative powder-coating provided on the coupling elements 234 and 236. (That is, the preferred electrically insulative powder-coating provided on the coupling elements 234 and 236 is a redundant means of electrically isolating the shaft assembly 20 and is not required for such electrical isolation to be achieved.)

Provision of an electrically isolated shaft assembly 20 preferably reduces the occurrence of detrimental arcing within the rotor bearings (not shown). Such arcing may conventionally be combated by use of grounding rings, which have a limited life, and/or relatively expensive ceramic bearings. The preferred embodiment permits the use of conventional ungrounded bearings, which reduces cost and enhances reliability.

It is permissible according to some aspects of the present invention, however, for the shaft assembly to be non-electrically isolated. For instance, in an alternative embodiment, the rotor might include an aluminum hub directly securing the pole segments to the shaft, such that the shaft is electrically connected to the pole segments.

It is noted that such an alternative embodiment preferably still provides the desired magnetic isolation of the pole segments. More particularly, while magnetic isolation of the pole segments and electrical isolation of the shaft are both provided in a preferred embodiment, selective use of materials in alternative embodiments enables either property to be maintained while the other is eliminated.

Additional alternative shaft assembly embodiments will be described in greater detail below.

Preferably, the retention structure 22 is configured in such a manner that the rotor 12 may be magnetized after assembly. However, pre-assembly magnetization is permissible.

The retention structure 22 is also preferably configured such that the rotor 12 may be balanced after assembly. More particularly, the access holes 198, 200 and 206, 208 formed in the front end 190 and the rear end 192, respectively, enable access to the inner and outer positioning openings 128 and 130 extending through each pole segment 116. One or more of the access holes 198, 200, 206, and 208 and/or one or more of the positioning openings 128 and 130 may be bored out as needed for the sake of balancing.

It is also noted that the positioning openings 128 and 130 are preferably filled with a non-magnetic substance. Such substance is preferably air, but an alternative material (e.g. a synthetic resin) could also be used. In the latter case, part or all of the non-air material, in addition to or instead of the pole segment material, could be bored out as needed for rotor balancing purposes.

In addition to the above balancing procedures, the magnets 18 may be shifted radially prior to overmolding if necessary. More particularly, as noted above, in a preferred embodiment, the nibs 184 preferably provide a spring force that holds the magnets 18 against the corresponding radially innermost tabs 134 of the pole segments 116, such that a space is provided between the magnets 18 and the radially outermost tabs 136. Such space provides positional flexibility for the magnets, provided the spring force provided by the nibs 184 is adjusted accordingly.

Figure 19:
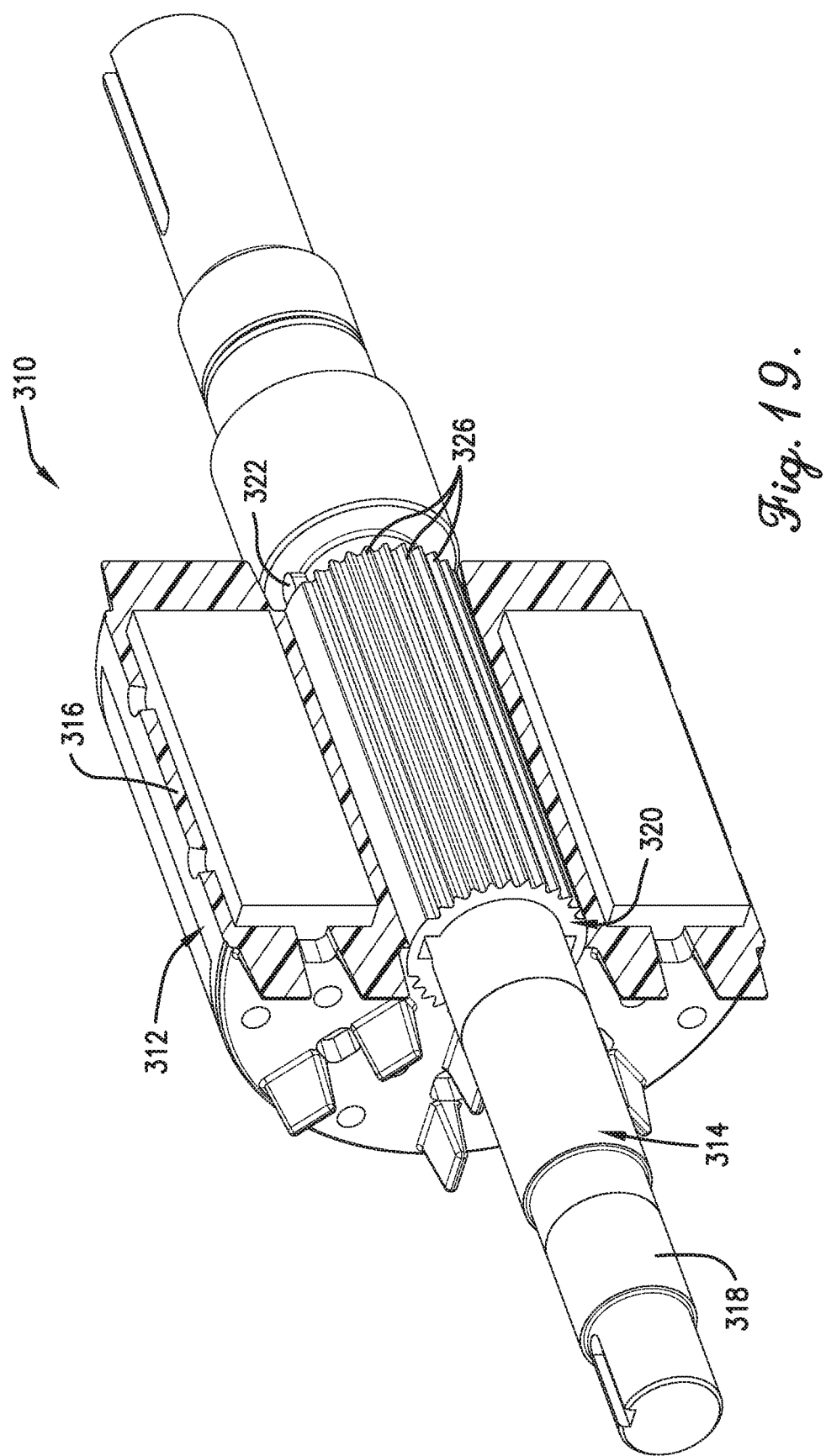
FIG. 19 is a partially sectioned front perspective view of a rotor in accordance with a second preferred embodiment of the present invention.
Figure 20:
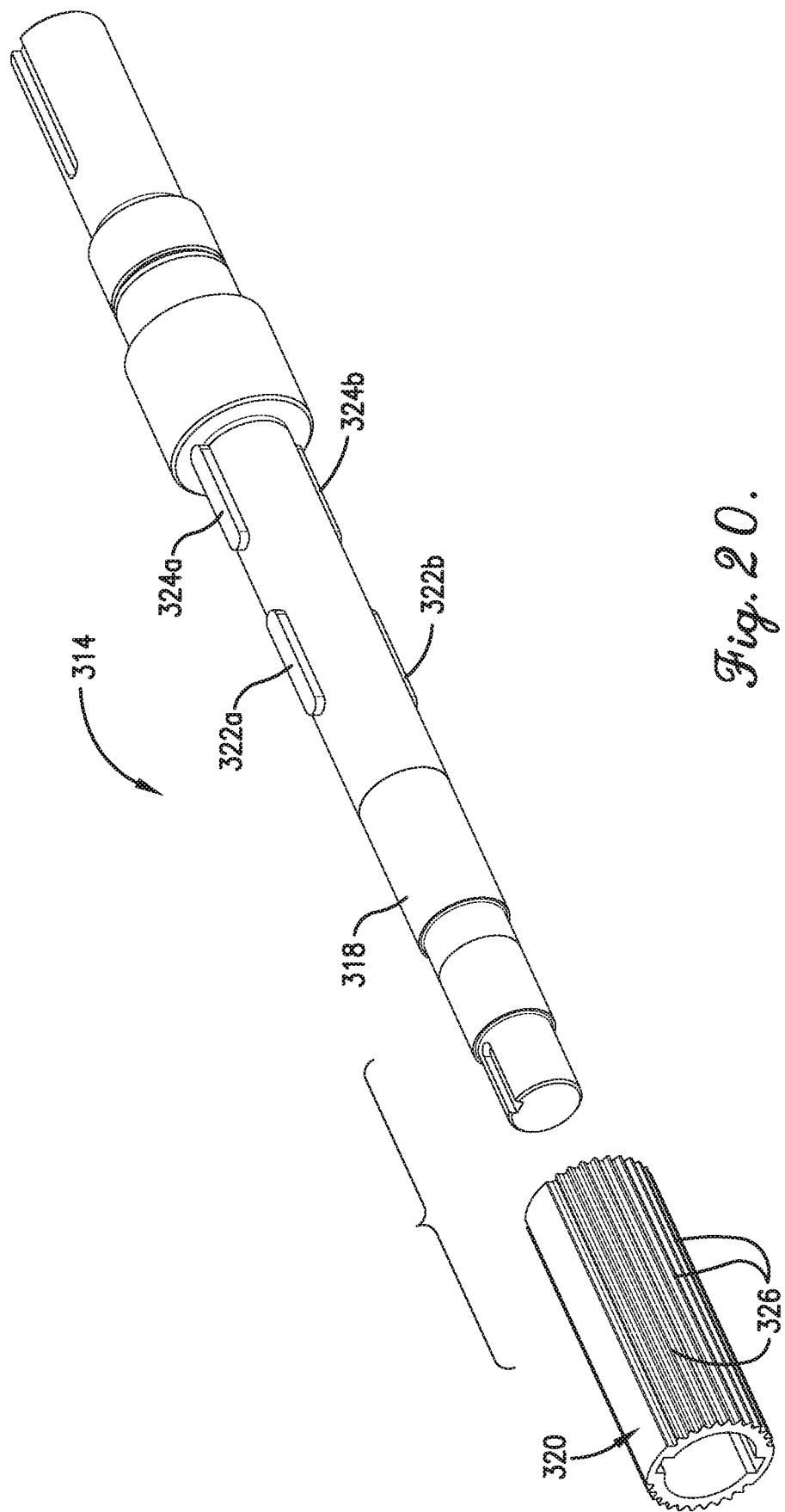
FIG. 20 is an axially exploded front perspective view of the shaft and coupler of the rotor of FIG. 19.
Figure 21:
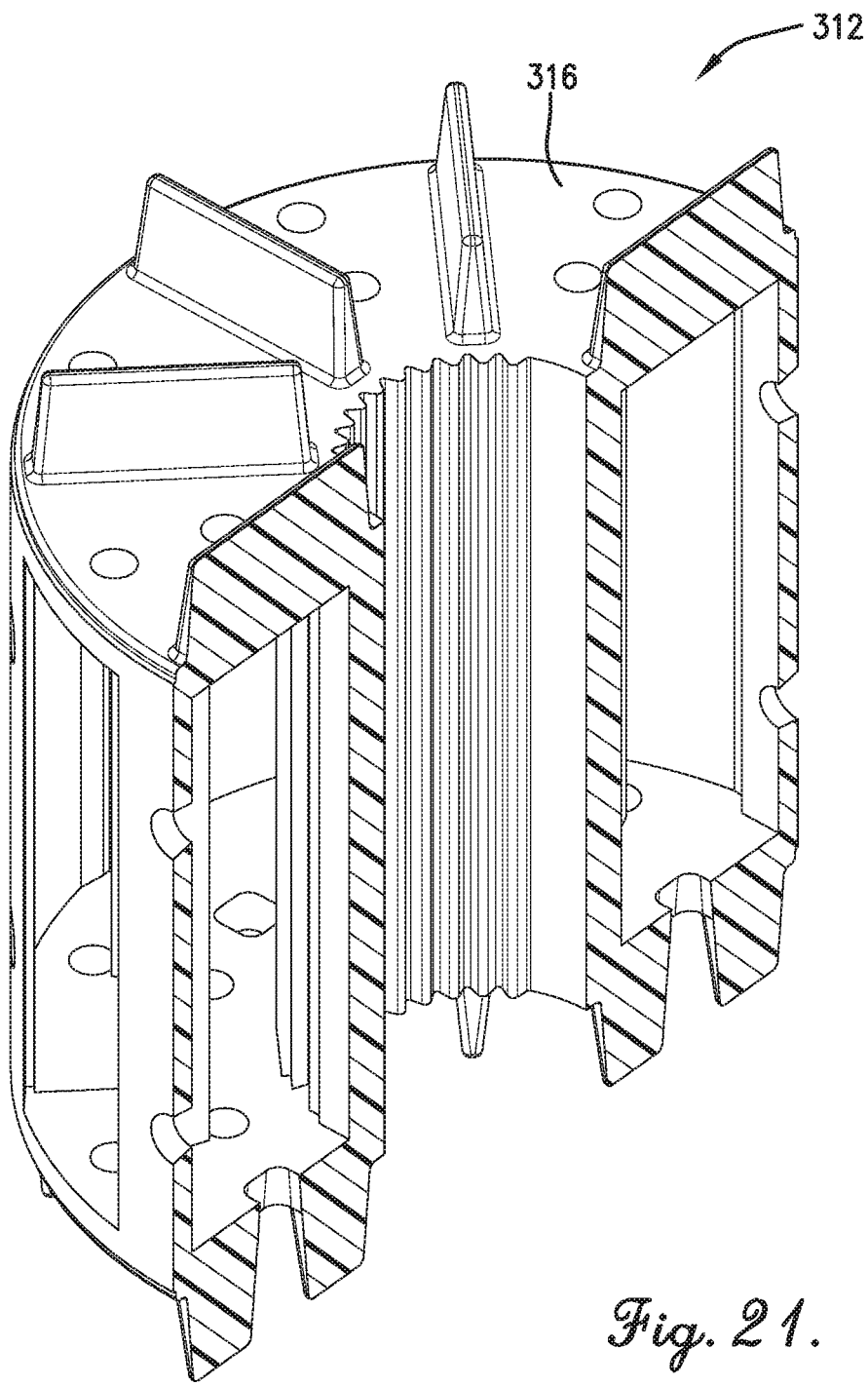
FIG. 21 is a cross-sectional front perspective view of the rotor overmolding of FIG. 19.
Figure 26:
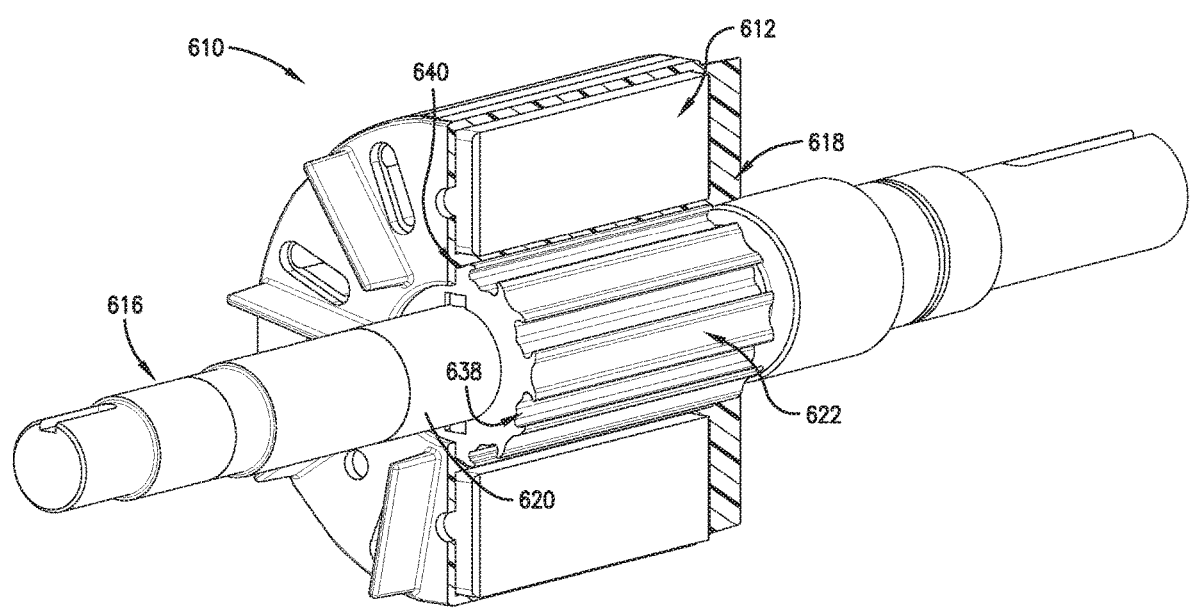
FIG. 26 is a partially sectioned front perspective view of a rotor in accordance with a fifth preferred embodiment of the present invention.
Figure 27:
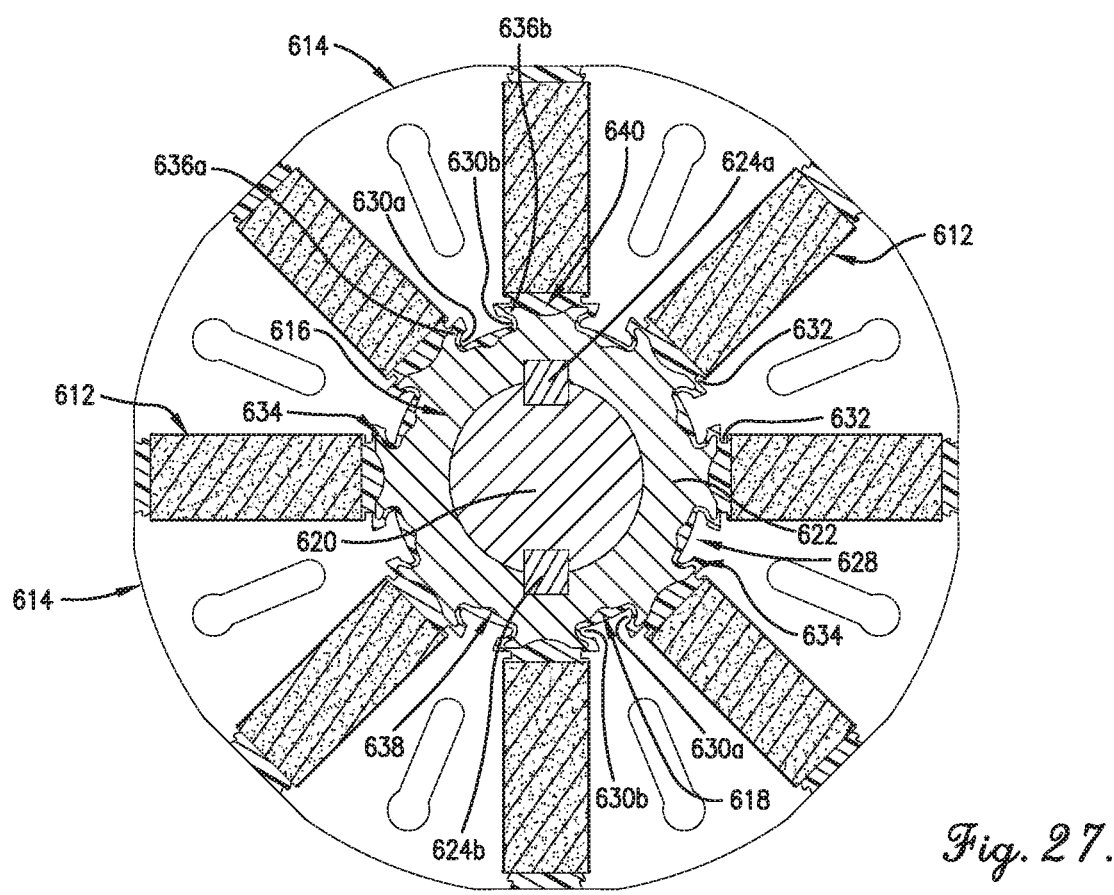
FIG. 27 is a cross-sectional front view of the rotor of FIG. 26.

A second preferred rotor 310 is illustrated in FIGS. 19-21. It is initially noted that, with certain exceptions to be discussed in detail below, many of the elements of the rotor 310 of the second embodiment are the same as or very similar to those described in detail above in relation to the rotor 12 of the first embodiment. Furthermore, the rotor 310 of the second preferred embodiment is suitable for use in a motor otherwise configured like the motor 10 of the first preferred embodiment or like alternative motors described above.

Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

As illustrated in FIGS. 19 and 21, the rotor 310 of the second preferred embodiment preferably includes a retention structure 312 and a shaft assembly 314. Similar to the retention structure 22 of the first preferred embodiment, the retention structure 312 of the second preferred embodiment preferably includes an overmolded body 316. The body 316 is preferably molded over part of the shaft assembly 314. In contrast to the shaft assembly 20 of the first preferred embodiment, however, the shaft assembly 314 of the second preferred embodiment preferably includes a shaft 318, a single coupling element 320, and two (2) pairs of keys 322*a,b* and 324*a,b* interconnecting the shaft 318 and the coupling element 320. The coupling element 320 preferably presents teeth 326 that engage the body 316.

Similar to the rotor 12 of the first preferred embodiment, the rotor 310 of the second preferred embodiment preferably provides both magnetic isolation of the pole segments and electrical isolation of the shaft assembly from remaining rotor components.

A third preferred rotor 410 is illustrated in FIGS. 22 and 23. It is initially noted that, with certain exceptions to be discussed in detail below, many of the elements of the rotor 410 of the third embodiment are the same as or very similar to those described in detail above in relation to the rotor 12 of the first embodiment and the rotor 310 of the second embodiment. Furthermore, the rotor 410 of the third preferred embodiment is suitable for use in a motor otherwise configured like the motor 10 of the first preferred embodiment or like alternative motors described above.

Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

As illustrated in FIGS. 22 and 23, the rotor 410 of the third preferred embodiment preferably includes a retention structure 412 and a shaft assembly 414. Similar to the retention structure 22 of the first preferred embodiment and the retention structure 312 of the second preferred embodiment, the retention structure 412 of the third preferred embodiment preferably includes an overmolded body 416. The body 416 is preferably molded over part of the shaft assembly 414. In contrast to the shaft assembly 20 of the first preferred embodiment and the shaft assembly 314 of the second preferred embodiment, however, the shaft assembly 414 of the third preferred embodiment preferably consists essentially of just a shaft 418. That is, no coupling element is provided between the shaft 418 and the body 416. Rather, the shaft 418 preferably presents teeth 420 that directly engage the body 416.

Similar to the rotor 12 of the first preferred embodiment and the rotor 310 of the second preferred embodiment, the rotor 410 of the third preferred embodiment preferably provides both magnetic isolation of the pole segments and electrical isolation of the shaft assembly from remaining rotor components.

A shaft assembly 510 of a fourth preferred rotor is illustrated in FIG. 24. It is initially noted that, with certain exceptions to be discussed in detail below, many of the elements of the shaft assembly 510 of the fourth embodiment are the same as or very similar to those described in detail above in relation to the shaft assembly 20 of the first embodiment, the shaft assembly 314 of the second embodiment, and the shaft assembly 414 of the third embodiment. Furthermore, the shaft assembly 510 of the fourth preferred embodiment is suitable for use in a motor otherwise configured like the motor 10 of the first preferred embodiment or like alternative motors described above.

Therefore, for the sake of brevity and clarity, redundant descriptions and numbering will be generally avoided here. Unless otherwise specified, the detailed descriptions of the elements presented above with respect to the first, second, and third embodiments should therefore be understood to apply at least generally to the fourth embodiment, as well.

As illustrated in FIG. 24, the shaft assembly 510 of the fourth preferred embodiment, preferably includes a shaft 512, a single coupling element 514, and two (2) pairs of keys 516a,b and 518a,b interconnecting the shaft 512 and the coupling element 514.

As shown in FIGS. 24 and 25, the coupling element 514 preferably presents teeth 520 that engage the body (not shown) of the retention structure (not shown) of the rotor. Each tooth 520 preferably projects generally radially outwardly.

Each tooth 520 preferably presents a pair of arcuately spaced apart side faces 522 and an outermost end face 524 extending between and interconnecting the side faces 522. The side faces 522 and the end faces 524 are each preferably straight, although it is permissible according to some aspects of the present invention for curved or otherwise non-linear faces to be present. For instance, a pair of straight side faces could be associated with a rounded (e.g., arcuately extending) end face.

Preferably, the side faces 522 of each tooth 520 are parallel to each other. More preferably, the side faces 522 of each tooth 520 are parallel to each other and orthogonal relative to the corresponding one of the end faces 524, such that each tooth 520 presents an at least substantially square or rectangular profile. In such a preferred embodiment, the teeth 520 will be understood to be parallel key splines. It is permissible according to some aspects of the present invention, however for the side faces to be non-parallel and/or non-orthogonal relative to the corresponding end face. For instance, each tooth profile might be a parallelogram, or the side faces might be angled toward each other such that each tooth has a tapered, trapezoidal profile.

Similar to the rotor 12 of the first preferred embodiment, the rotor 310 of the second preferred embodiment, and the rotor 410 of the third preferred embodiment, the rotor of the fourth preferred embodiment preferably provides both magnetic isolation of the pole segments and electrical isolation of the shaft assembly from remaining rotor components.

A fifth preferred rotor 610 is illustrated in FIGS. 26-29. The fifth preferred rotor 610 preferably includes a plurality of magnets 612, a plurality of pole segments 614, a shaft assembly 616, and a retention structure 618.

It is initially noted that, with certain exceptions to be discussed in detail below, many of the elements of the rotor 610 of the fifth embodiment are the same as or very similar to those described in detail above in relation to the rotors of the first, second, third and fourth embodiments. Furthermore, the rotor 610 of the fifth preferred embodiment is suitable for use in a motor otherwise configured like the motor 10 of the first preferred embodiment or like alternative motors described above.

Therefore, for the sake of brevity and clarity, redundant descriptions and numbering will be generally avoided here. Unless otherwise specified, the detailed descriptions of the elements presented above with respect to the first, second, third, and fourth embodiments should therefore be understood to apply at least generally to the fifth embodiment, as well.

As illustrated in FIG. 28, the shaft assembly 616 of the fifth preferred embodiment preferably includes a shaft 620, a single coupling element 622, and two (2) pairs of keys 624a,b and 626a,b interconnecting the shaft 620 and the coupling element 622.

In a preferred embodiment, each pole segment 614 interlocks with the coupling element 622. Preferably, such interlocking is by means of respective dovetail connections. More particularly, in the fifth preferred embodiment illustrated in FIGS. 26-29, each pole segment 614 preferably includes a dovetail projection 628 having oppositely arcuately spaced shoulders 630a,b. Each pole segment 614 preferably also includes oppositely circumferentially outwardly projecting tabs 632 for restricting radial displacement of corresponding magnets 612 (in accordance with previously-described embodiments). Along each side of each pole segment 614, a tab 632 and a corresponding shoulder 630a or 630b at least partly circumscribe and define a recess 634 therebetween.

Turning to FIG. 29, the coupling element 622 preferably includes a plurality of pairs of oppositely arcuately spaced shoulders 636a, b. Each pair of shoulders 636a, 636b preferably at least partly circumscribes and defines a dovetail recess 638 therebetween.

In the fifth preferred embodiment, the shoulders 630a,b of each dovetail projection 628 preferably nest within a respective recess 638 defined by the coupling element 622. More particularly, each shoulder 630a is preferably adjacent to and spaced radially inside a corresponding shoulder 636a in an at least partially arcuately overlapping relationship. Likewise, each shoulder 630b is preferably adjacent to and spaced radially inside a corresponding shoulder 636b in an at least partially overlapping relationship. Further, each shoulder 636a, b preferably extends substantially into a recess 634 between a respective tab 632 and corresponding shoulder 630a or 630b. More particularly, each shoulder 636a, b is preferably spaced radially inside a respective tab 632 and radially outside a respective corresponding shoulder 630a or 630b, in each case in an at least partially overlapping relationship.

As noted above, each pole segment 614 preferably comprises a magnetically conductive metallic material such as steel. Moreover, the coupling element 622 preferably comprises aluminum. In the fifth preferred embodiment, the interlocking dovetail connection of each pole segment 614 therefore includes four metal shoulders 630a, 630b, 636a, 636b, each of which is assembled into a position in a respective recess 638, 634 defined between opposing metal surfaces. The resulting redundantly meshed metal dovetail connections of the fifth preferred embodiment provide structural advantages to the rotor 610. For example, the pole segments 614 are preferably securely held for rotation with the shaft assembly 616 at least in part due to the redundantly meshed metal dovetail connections, exhibiting enhanced structural rigidity.

Preferably, the coupling element 622 of the fifth preferred embodiment extends radially in one piece between the shaft 620 and each shoulder 636a, b, without intervening joints that might reduce structural integrity. More preferably, the coupling element 622 also comprises a single, monolithic body extending circumferentially and circumscribing the shaft 620. One of ordinary skill will also appreciate that a single, monolithic piece incorporating an entire shaft assembly—for example, a shaft and coupling element, excluding keys for interconnecting same—is clearly within the ambit of certain aspects of the present invention. Such single piece, monolithic components may be substantially homogenous throughout, and may be formed through casting and/or machining fabrication processes. Notwithstanding the preferred embodiment(s) discussed above, it is also foreseen that a coupling element may comprise heterogenous structure(s) and/or multiple assembled pieces without departing from the spirit of the present invention.

Moreover, although it is preferable for the male dovetail projections to be provided on the pole segments and the corresponding recesses to be defined by the coupling element, it is permissible for the opposite to be true or for the projections and recesses to be distributed between the pole segments and the coupling element. Further, dovetail connections without redundant meshing are clearly within the ambit of the present invention. Still further, while dovetail interconnections are preferred, it is noted that a variety of other interlocking forms known in the art may suitably be used.

In a preferred embodiment, the retention structure 618 includes an overmolded body 640 formed between the shaft assembly 616 and pole segments 614/magnets 612. Preferably, the coupling element 622 is interposed between the shaft 620 and the body 640. More preferably, the body 640 is overmolded over the coupling element 622 and at least portions of the pole segments 614.

The shaft assembly 616 preferably engages the overmolded body 640 so that each of the overmolded body 640, the pole segments 614, and the magnets 612 secured by the body 640 rotates with the shaft assembly 616. In such a preferred embodiment, the overmolded body 640 itself at least in part secures the shaft assembly 616, the pole segments 614, and the magnets 612 to one another.

In a preferred embodiment, the shaft assembly 616 is electrically isolated from the pole segments 614. More particularly, in a preferred embodiment, the body 640 and the coupling element 622 are at least in part formed of electrically insulative materials. As noted previously, the material forming the body 640 is preferably additionally magnetically insulative. For instance, in a preferred embodiment, the body 640 comprises a both magnetically and electrically insulative synthetic resin.

The coupling element 622 preferably comprises aluminum (i.e., an electrically conductive material) powder-coated with an least substantially electrically insulative material. In such a preferred embodiment, as discussed above, structural advantages are provided due to use of a metallic coupling element. However, electrical isolation of the entire shaft assembly 616 is still retained due primarily to spacing of the shaft assembly 616 (including the metallic coupling element 622) from the pole segments 614 by the electrically insulative body 640. Secondary electrical isolation is provided due to the electrically insulative powder-coating provided on the coupling element 622. (That is, the preferred electrically insulative powder-coating provided on the coupling element 622 is a redundant means of electrically isolating the shaft assembly 616 and is not required for such electrical isolation to be achieved.)

As noted previously, provision of an electrically isolated shaft assembly 616 preferably reduces the occurrence of detrimental arcing within the rotor bearings (not shown). Such arcing may conventionally be combated by use of grounding rings, which have a limited life, and/or relatively expensive ceramic bearings. The preferred embodiment permits the use of conventional ungrounded bearings, which reduces cost and enhances reliability.

Similar to the rotor 12 of the first preferred embodiment, the rotor 310 of the second preferred embodiment, the rotor 410 of the third preferred embodiment, and the rotor of the fourth preferred embodiment, the rotor 610 of the fifth preferred embodiment preferably provides both magnetic isolation of the pole segments and electrical isolation of the shaft assembly from remaining rotor components.

It is permissible according to some aspects of the present invention, however, for the shaft assembly to be non-electrically isolated. For instance, in an alternative embodiment, the rotor might include an aluminum coupling element directly securing the pole segments to the shaft, such that the shaft is electrically connected to the pole segments.

It is noted that such an alternative embodiment preferably still provides the desired magnetic isolation of the pole segments. More particularly, while magnetic isolation of the pole segments and electrical isolation of the shaft are both provided in a preferred embodiment, selective use of materials in alternative embodiments enables either property to be maintained while the other is eliminated.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A rotor for use in an electric motor, said rotor comprising:
   a shaft assembly rotatable about an axis and including a shaft, a coupling element, and a key interconnecting the shaft and the coupling element;
   a plurality of magnets arranged arcuately about the shaft assembly; and
   a plurality of pole segments arranged arcuately about the shaft assembly,
   said pole segments alternating with the magnets, such that each of said magnets is at least in part interposed between adjacent pole segments, said pole segments interlocking with the coupling element, said coupling element comprising a monolithic, homogenous body that extends circumferentially about the shaft, with the body projecting from the shaft to interlock with the pole segments, said pole segments interlocking with said coupling element via a dovetail connection, each of said pole segments comprising a metal and including—
 a dovetail projection having oppositely arcuately spaced pole segment shoulders,
 oppositely circumferentially outward' projecting tabs spaced radially outwardly from said pole segment shoulders, said coupling element comprising a metal and including a plurality of arcuately spaced pairs of shoulders, each pair comprising a first shoulder and a second shoulder together at least partly circumscribing and defining a dovetail recess,
 wherein,
  each of said pole segment shoulders is spaced radially inside and is adjacent to a respective one of said coupling element shoulders,
  each of said coupling element shoulders is spaced radially inside and is adjacent to a respective one of said tabs.

2. The rotor as claimed in claim 1,
said shaft assembly being magnetically isolated from said pole segments.

3. The rotor as claimed in claim 2,
said coupling element comprising an electrically conductive material powder-coated with an at least substantially electrically insulative material.

4. The rotor as claimed in claim 1, further comprising:
retention structure securing the pole segments relative to one another.

5. The rotor as claimed in claim 4,
said retention structure being formed of a magnetically insulative material.

6. The rotor as claimed in claim 4,
said retention structure comprising a body overmolded over at least portions of the pole segments.

7. The rotor as claimed in claim 6,
said body being overmolded over the coupling element so as to secure the shaft assembly and pole segments to one another.

8. The rotor as claimed in claim 7,
said shaft assembly being magnetically and electrically isolated from said pole segments.

9. The rotor as claimed in claim 7,
each of said magnets presenting a radially innermost face abutting the body,
said body being overmolded over at least portions of the magnets so as to secure the magnets relative to one another and relative to the pole segments.

10. A rotor for use in an electric motor, said rotor comprising:
a shaft assembly rotatable about an axis and including a shaft and a metal coupling element;
a plurality of magnets arranged arcuately about the shaft assembly; and a plurality of pole segments arranged arcuately about the shaft assembly, said pole segments alternating with the magnets, such that each of said magnets is at least in part interposed between adjacent pole segments, said pole segments interlocking with the coupling element, said pole segments interlocking with said coupling element via a dovetail connection, each of said pole segments comprising a metal and including—
 a dovetail projection having oppositely arcuately spaced pole segment shoulders,
 oppositely circumferentially outwardly projecting tabs spaced radially outwardly from said pole segment shoulders, said coupling element including a plurality of arcuately spaced pairs of shoulders, each pair comprising a first shoulder and a second shoulder at least partly circumscribing and defining a dovetail recess,
 wherein,
  each of said pole segment shoulders is spaced radially inside and is adjacent to a respective one of said coupling element shoulders,
  each of said coupling element shoulders is spaced radially inside and is adjacent to a respective one of said tabs.

11. The rotor as claimed in claim 10,
said shaft assembly being magnetically isolated from said pole segments.

12. The rotor as claimed in claim 11,
said coupling element comprising an electrically conductive material powder-coated with an at least substantially electrically insulative material.

13. The rotor as claimed in claim 10, further comprising:
retention structure securing the pole segments relative to one another.

14. The rotor as claimed in claim 13,
said retention structure being formed of a magnetically insulative material.

15. The rotor as claimed in claim 13,
said retention structure comprising a body overmolded over at east portions of the pole segments.

16. The rotor as claimed in claim 15,
said body being overmolded over the coupling element so as to secure the shaft assembly and pole segments to one another.

17. The rotor as claimed in claim 16,
said shaft assembly being magnetically and electrically isolated from said pole segments.

18. The rotor as claimed in claim 16,
each of said magnets presenting a radially innermost face abutting the body,
said body being overmolded over at least portions of the magnets so as to secure the magnets relative to one another and relative to the pole segments.

19. The rotor as claimed in claim 10, further comprising a key interconnecting the shaft to the metal coupling element.

* * * * *